United States Patent
Lu et al.

(10) Patent No.: US 11,252,723 B1
(45) Date of Patent: Feb. 15, 2022

(54) MODIFYING A VEHICULAR RADIO BASED ON A SCHEDULE OF POINT-TO-POINT VEHICULAR COMMUNICATIONS

(71) Applicant: Toyota Motor Engineering & Manufacturing North America, Inc., Plano, TX (US)

(72) Inventors: Hongsheng Lu, Mountain View, CA (US); Bin Cheng, Mountain View, CA (US)

(*) Notice: Subject to any disclaimer, the term of this patent is extended or adjusted under 35 U.S.C. 154(b) by 0 days.

(21) Appl. No.: 17/012,451

(22) Filed: Sep. 4, 2020

(51) Int. Cl.
*H04W 72/04* (2009.01)
*H04W 84/00* (2009.01)
(Continued)

(52) U.S. Cl.
CPC ......... *H04W 72/0446* (2013.01); *H04L 41/16* (2013.01); *H04W 4/46* (2018.02); *H04W 84/005* (2013.01)

(58) Field of Classification Search
CPC .... H04B 7/0695; H04B 7/088; H04B 7/0617; H04B 17/318; H04B 7/0408; H04B 7/0639; H04B 7/043; H04B 17/24; H04B 7/0626; H04B 7/0691; H04B 17/309; H04B 7/0404; H04B 7/0413; H04B 7/063; H04B 17/327; H04B 17/336; H04B 17/345; H04B 7/026; H04B 7/0456; H04B 7/0608; H04W 16/28; H04W 72/046; H04W 4/40; H04W 24/10; H04W 72/042; H04W 74/0833;
(Continued)

(56) References Cited

U.S. PATENT DOCUMENTS

2017/0290034 A1* 10/2017 Desai .................... H04W 4/027
2019/0132709 A1    5/2019 Graefe et al.
(Continued)

FOREIGN PATENT DOCUMENTS

WO    2019017215    1/2019

OTHER PUBLICATIONS

Khan, Hamza et al., "Reinforcement Learning Based Vehicle-cell Association Algorithm for Highly Mobile Millimeter Wave Communication," IEEE Transactions on Cognitive Communications and Netowkring 5.4, 2019, pp. 1073-1085.
(Continued)

*Primary Examiner* — Golam Sorowar
(74) *Attorney, Agent, or Firm* — Burbage Law, P.C.; Jon-Michael Burbage; Elizabeth Ruzich

(57) ABSTRACT

The disclosure includes embodiments for modifying a vehicle-to-everything (V2X) radio of an ego vehicle that is a connected vehicle. In some embodiments, a method includes analyzing, by a machine learning module executed by a processor, a local dynamic map generated by the ego vehicle to determine schedule data describing a schedule for the ego vehicle to transmit a millimeter wave (mmWave) message to a remote vehicle. The method includes transmitting a V2X message including the schedule data for receipt by the remote vehicle so that the remote vehicle has access to the schedule. The method includes modifying an operation of the V2X radio of the ego vehicle based on the schedule so that the V2X radio transmits the mmWave message to the remote vehicle in compliance with the schedule. The method includes transmitting the mmWave message to the remote vehicle in compliance with the schedule.

20 Claims, 13 Drawing Sheets

(51) Int. Cl.
*H04L 12/24* (2006.01)
*H04W 4/46* (2018.01)

(58) Field of Classification Search
CPC ......... H04W 4/46; H04W 4/70; H04W 8/005; H04W 76/14; H04W 48/16; H04W 4/44; H04W 72/0453; H04W 84/18; H04W 92/18; H04W 4/38; H04W 72/048; H04W 24/02; H04W 4/029; H04W 64/006; H04L 5/0048; H04L 5/0023; H04L 5/0053; H04L 67/12; H04L 1/08; H04L 2001/0093; H04L 5/0055; H04L 5/001; H04L 5/0051; H04L 5/0094; H04L 1/1816; H04L 1/1819; H04L 2001/0097; H04L 27/2607; H04L 5/0007; H04L 5/005; H04L 1/0017; H04L 1/1671; H04L 1/1812; H04L 2027/0095
See application file for complete search history.

(56) References Cited

U.S. PATENT DOCUMENTS

| | | | |
|---|---|---|---|
| 2019/0222652 A1 | 7/2019 | Graefe et al. | |
| 2019/0239040 A1* | 8/2019 | Va | H04W 72/02 |
| 2019/0256088 A1* | 8/2019 | Sharma | B60W 50/14 |
| 2019/0266295 A1* | 8/2019 | Masuda | G06F 30/20 |
| 2019/0361439 A1* | 11/2019 | Zeng | G05D 1/0278 |
| 2019/0361456 A1* | 11/2019 | Zeng | G01C 21/20 |
| 2020/0004269 A1 | 1/2020 | Oba | |
| 2020/0229205 A1* | 7/2020 | Bharadwaj | H04W 72/04 |
| 2020/0374858 A1* | 11/2020 | Vargas | H04W 16/28 |

OTHER PUBLICATIONS

Atallah, Ribal et al., "Deep Reinforcement Learning-based Scheduling for Roadside Communication Networks," 2017 15th International Symposium on Modeling and Optimization in Mobile, Ad Hoc, and Wireless Networks (WiOpt), 2017, 8 pages.

Wang, Jian et al., "Deep Reinforcement Learning for Scheduling in Cellular Networks," 2019 11th International Conference on Wireless Communications and Signal Processing (WCSP), 2019, 6 pages.

Chinchali, Sandeep et al., "Cellular Network Traffic Scheduling with Deep Reinforcement Learning," AAAI, 2018, 9 pages.

* cited by examiner

MODIFYING A VEHICULAR RADIO BASED ON A SCHEDULE OF POINT-TO-POINT VEHICULAR COMMUNICATIONS

BACKGROUND

The specification relates to modifying a Vehicle-to-Everything (V2X) radio for Millimeter Wave (mmWave) communications based on a schedule of point-to-point communications between vehicles.

Radio waves in an Extremely High Frequency ("EHF") band (e.g., about 28 to 300 gigahertz ("GHz")) have wavelengths from ten to one millimeter and are consequently referred to as millimeter waves ("mmWave" or "mmWaves"). A challenge in mmWave communication includes beam alignment. The mmWave communication between two endpoints is not possible without first completing a beam alignment process between these two endpoints. For example, beamforming with narrow beams is needed to compensate high propagation loss at the mmWave band and appropriate beam pointing at both a receiver and a transmitter is needed. It is currently difficult or impossible to implement mmWave communication in vehicles because existing technologies cannot complete a beam alignment process in a timely fashion that is sufficiently quick for vehicular applications. For example, vehicles travel quickly on roadways, and if an endpoint for a mmWave communication is a vehicle (or worse yet, both endpoints for an mmWave communication are vehicles), then it is needed to execute a beam alignment process in a short amount of time.

An existing solution for beam alignment is known as "beam training by beam sweeping." This solution is not adequate for vehicle applications because it is designed for low mobility environments and does not work for high mobility environments such as present in vehicle applications.

SUMMARY

In an environment in which vehicles share data received from their sensors, an example purpose of the embodiments described herein is to facilitate the use of high data rate mmWave communications for this application by optimizing the scheduling of mmWave communications.

Because mmWave communications are point-to-point, in the absence of the embodiments described herein, mmWave communications need to be accomplished according to fixed rule scheduling (based on the topology of the network), which in an environment of moving vehicles is not optimal. The embodiments of the modification system described herein solve this problem as well as others.

Described are embodiments of a modification system installed in an electronic control unit (ECU) of a first endpoint and a feedback system installed in a connected computing device such as a server (e.g., a cloud server). The modification system and the feedback system cooperate with one another to modify one or more of a V2X radio of the first endpoint and a V2X radio of a second endpoint so that a mmWave message can be exchanged between the first endpoint and the second endpoint.

In some embodiments, the feedback system collects data from various vehicles that are enabled with mmWave communication capabilities about which beam pair settings have been successful for them in different scenarios. The modification system of each of the various vehicles provides this information to the feedback system. The feedback system builds a database describing which beam pair settings work best in different scenarios. Later, after the database is built, the modification system of an ego vehicle can execute one or more of the following operations: (1) determining that a mmWave message is desired to be exchanged with a remote vehicle; (2) determining digital data describing a current scenario; (3) requesting a recommended beam alignment setting from the feedback system based on the current scenario; (4) receiving feedback data describing the recommended beam alignment setting based on the current scenario; (5) taking one or more actions to modify the mmWave radio settings of the ego vehicle (and, optionally, the mmWave radio settings of the remote vehicle as well) based on the feedback data provided by the feedback system describing the recommended beam alignment setting; and (6) exchanging the mmWave message with the remote vehicle using the recommended beam alignment setting.

Some existing solutions rely on beam training that does not work in vehicular applications because it takes too much time. By comparison to the existing solutions, the modification system described herein determines a beam alignment setting for a V2X radio of the ego vehicle based on feedback data received from a connected computing device such as a server (e.g., a cloud server) that maintains a database of optimal beam alignment settings in different real-world scenarios as experienced and reported by actual real-world vehicles. The modification system and the feedback system described herein are an improvement over the existing solutions because, for example, they allow beam alignment to occur in a time frame that permits mmWave communications to be consistently achievable by vehicles.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for an ego vehicle, including: analyzing, by a machine learning module executed by a processor, a local dynamic map generated by the ego vehicle to determine schedule data describing a schedule for the ego vehicle to transmit a mmWave message to a remote vehicle; transmitting, using a non-mmWave type channel of a V2X radio of the ego vehicle, a V2X message including the schedule data for receipt by the remote vehicle so that the remote vehicle has access to the schedule; modifying an operation of the V2X radio of the ego vehicle based on the schedule so that the V2X radio transmits the mmWave message to the remote vehicle in compliance with the schedule; and transmitting, using a mmWave type channel of the V2X radio, the mmWave message to the remote vehicle in compliance with the schedule. Other embodiments of this aspect include corresponding computer systems, apparatus, and computer programs recorded on one or more computer storage devices, each configured to perform the actions of the methods.

Implementations may include one or more of the following features. The method where the machine learning module includes a reinforcement learning scheduling algorithm with machine learning which is executed by the processor and causes the processor to execute a machine learning process using the local dynamic map as an input to the machine learning process which outputs schedule data describing the schedule, where the schedule is provided to the V2X radio to modify the operation of the V2X radio so that the mmWave message is transmitted in compliance with the schedule. The method where the mmWave message includes a payload that includes sensor data describing sensor measurements recorded by the ego vehicle. The method where the local dynamic map includes a set of cells that represent a roadway environment and the local dynamic map is updated to include state information about whether the cells are occupied on a cell-by-cell basis. The method where the local dynamic map includes a set of cells that represent a roadway environment and the local dynamic map is updated to include probability information about whether the cells are occupied on a cell-by-cell basis. The method where the schedule includes information that describes one or more of the following: a prediction about a location of the remote vehicle at a particular time; a prediction about a quality of a communication link between the ego vehicle and the remote vehicle at the particular time; and a prediction about the usefulness of a payload of the mmWave message for both the ego vehicle and the remote vehicle. The method further including a feedback loop that is operable to determine a success of the mmWave message and update the schedule based on the success so that a likelihood of a future success of a future mmWave message is increased. The method where the schedule describes times and locations for transmitting the mmWave message. Implementations of the described techniques may include hardware, a method or process, or computer software on a computer-accessible medium.

One general aspect includes a system including: an onboard vehicle computer system of an ego vehicle including a non-transitory memory storing computer code which, when executed by the onboard vehicle computer system, causes the onboard vehicle computer system to: analyze, by a machine learning module executed by the onboard vehicle computer system, a local dynamic map generated by the ego vehicle to determine schedule data describing a schedule for the ego vehicle to transmit a mmWave message to a remote vehicle; transmit, using a non-mmWave type channel of a V2X radio of the ego vehicle which is communicatively coupled to the onboard vehicle computer system, a V2X message including the schedule data for receipt by the remote vehicle so that the remote vehicle has access to the schedule; modify an operation of the V2X radio of the ego vehicle based on the schedule so that the V2X radio transmits the mmWave message to the remote vehicle in compliance with the schedule; and transmit, using a mmWave type channel of the V2X radio, the mmWave message to the remote vehicle in compliance with the schedule. Other embodiments of this aspect include corresponding computer systems, apparatus, and computer programs recorded on one or more computer storage devices, each configured to perform the actions of the methods.

Implementations may include one or more of the following features. The system where the machine learning module includes a reinforcement learning scheduling algorithm with machine learning which is executed by the onboard vehicle computer system and causes the onboard vehicle computer system to execute a machine learning process using the local dynamic map as an input to the machine learning process which outputs schedule data describing the schedule, where the schedule is provided to the V2X radio to modify the operation of the V2X radio so that the mmWave message is transmitted in compliance with the schedule. The system where the mmWave message includes a payload that includes sensor data describing sensor measurements recorded by the ego vehicle. The system where the local dynamic map includes a set of cells that represent a roadway environment and the local dynamic map is updated to include state information about whether the cells are occupied on a cell-by-cell basis. The system where the local dynamic map includes a set of cells that represent a roadway environment and the local dynamic map is updated to include probability information about whether the cells are occupied on a cell-by-cell basis. Implementations of the described techniques may include hardware, a method or process, or computer software on a computer-accessible medium.

One general aspect includes a computer program product including a non-transitory memory of an onboard vehicle computer system of an ego vehicle storing computer-executable code that, when executed by a processor, causes the processor to: analyze, by a machine learning module executed by the onboard vehicle computer system, a local dynamic map generated by the ego vehicle to determine schedule data describing a schedule for the ego vehicle to transmit a mmWave message to a remote vehicle; transmit, using a non-mmWave type channel of a V2X radio of the ego vehicle, a V2X message including the schedule data for receipt by the remote vehicle so that the remote vehicle has access to the schedule; modify an operation of the V2X radio of the ego vehicle based on the schedule so that the V2X radio transmits the mmWave message to the remote vehicle in compliance with the schedule; and transmit, using a mmWave type channel of the V2X radio, the mmWave message to the remote vehicle in compliance with the schedule. Other embodiments of this aspect include corresponding computer systems, apparatus, and computer programs recorded on one or more computer storage devices, each configured to perform the actions of the methods.

Implementations may include one or more of the following features. The computer program product where the machine learning module includes a reinforcement learning scheduling algorithm with machine learning which is executed by the processor and causes the processor to execute a machine learning process using the local dynamic map as an input to the machine learning process which outputs schedule data describing the schedule, where the schedule is provided to the V2X radio to modify the operation of the V2X radio so that the mmWave message is transmitted in compliance with the schedule. The computer program product where the mmWave message includes a payload that includes sensor data describing sensor measurements recorded by the ego vehicle. The computer program product where the local dynamic map includes a set of cells that represent a roadway environment and the local dynamic map is updated to include state information about whether the cells are occupied on a cell-by-cell basis. The computer program product where the local dynamic map includes a set of cells that represent a roadway environment and the local dynamic map is updated to include probability information about whether the cells are occupied on a cell-by-cell basis. The computer program product further including a feedback loop that is operable to determine a success of the mmWave message and update the schedule based on the success so that a likelihood of a future success of a future mmWave message is increased. The computer program product where the schedule describes times and locations for transmitting the mmWave message. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1A:
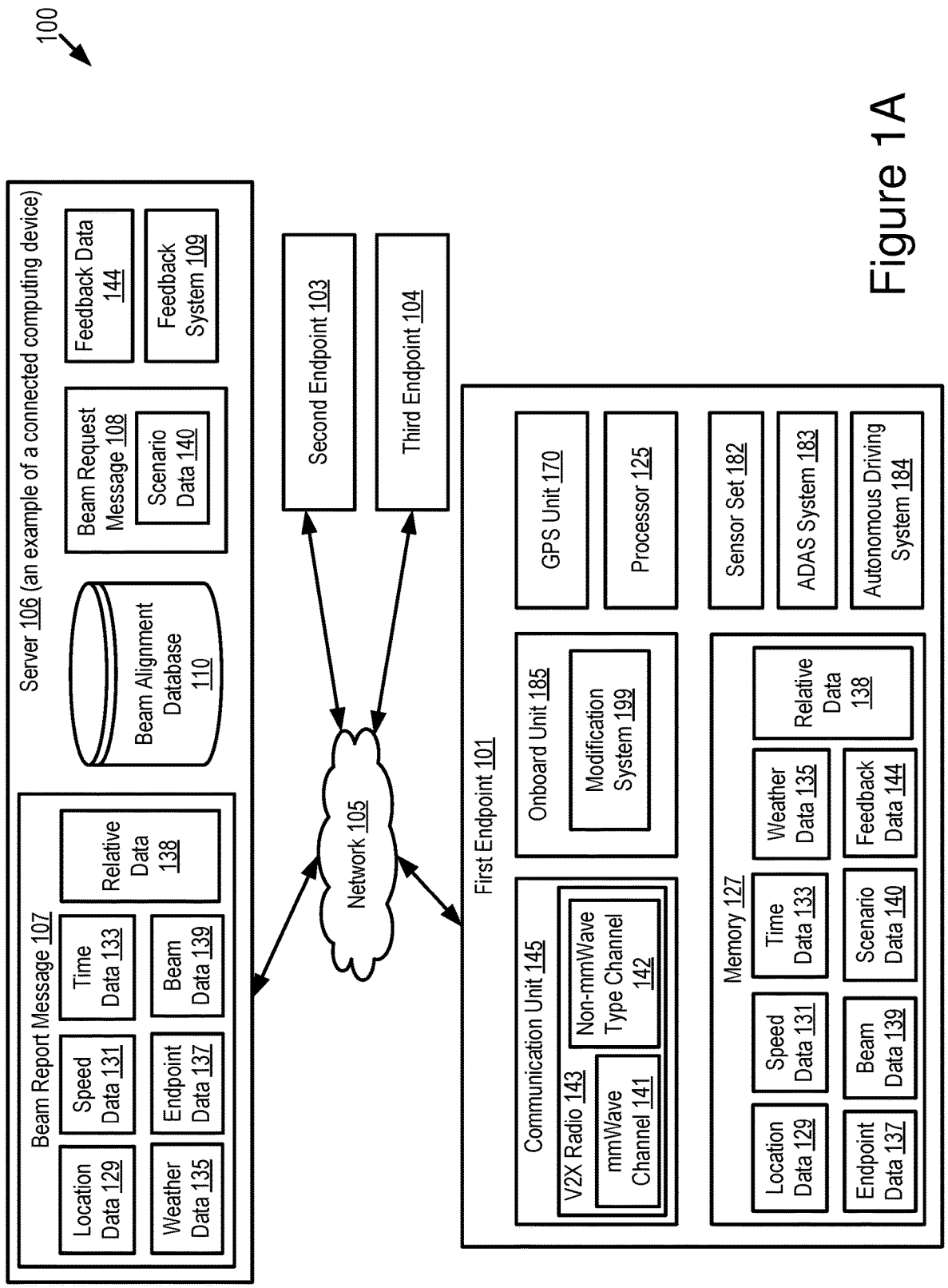
FIG. 1A is a block diagram illustrating an operating environment for a modification system and a feedback system according to some embodiments.

Deploying mmWave communication has become cheaper recently due to advancements in Complementary metal-oxide-semiconductor (CMOS) technology. Deploying mmWave communication in vehicles is desirable because future vehicles may require data rates with a magnitude of gigabits per second (Gbps) and mmWave communication is capable of providing Gbps data rates over short ranges.

Application of mmWave communication is beneficial since the mmWave communication enables communication devices to send and receive large amounts of data (e.g., 0 to 1000 gigabytes) in an amount of time that is acceptable to users or within some predetermined safety standard. The mmWave communication has a great potential for massive consumer applications (e.g., IEEE802.11ad/WiGig for high-speed and short-range communication; 5G cellular communications; automated driving applications, etc.). The automated driving applications include, but are not limited to: (1) sharing local sensor information recorded by sensors such as a LIDAR, radar, camera, etc., with connected vehicles and infrastructure devices to expand sensor coverage and obtain non-line-of-sight (NLOS) view so as to achieve a safer, efficient and proactive driving; (2) uploading local sensor information to a cloud server via infrastructures for high-definition (HD) 3D map generation at the cloud server so that a global HD 3D map can be kept updated; and (3) downloading a HD 3D map for automated driving from infrastructures on demand when a vehicle enters a new city so that there is no need to store all 3D map data of an entire country in the vehicle's storage and it is easy to keep the 3D map data updated. Transmission and reception of HD 3D maps and vehicle sensor information has many applications. One application that may benefit from the ability to transmit and receive HD 3D maps and vehicle sensor information is automated vehicles, drones, and robots.

For example, mmWave communication may be used to communicate with (1) roadside equipment or (2) other vehicles. Because of the wide bandwidth available, mmWave communication may be particularly beneficial for transmitting and receiving large data sets. Example data that may be transmitted and received via mmWave communication include, among other things, (1) high definition 3D maps and (2) vehicle sensor information. This information may not be reasonable to be transmitted via conventional means (e.g., 3G, 4G, WiFi, Dedicated Short Range Communication (DSRC)) because transmission of the large amount of data via conventional means may either not be reasonably possible or may result in poor performance of the vehicle equipment. However, transmission of this information via mmWave communication can be routinely achieved and may not result in poor performance of our vehicle equipment.

Existing solutions such as "beam training by beam sweeping" are not suitable for vehicle applications because it is designed for low mobility environments. Vehicle applications frequently include high mobility environments. Thus, embodiments of a modification system and a feedback system are described herein that are capable of modifying one or more of a V2X radio of a first endpoint and a V2X radio of a second endpoint based on beam alignment feedback data so that a mmWave message can be exchanged between the first endpoint and the second endpoint. The modification system and the feedback system are described in more detail below.

In some embodiments, a vehicle that includes the modification system is a DSRC-equipped vehicle. A DSRC-equipped vehicle is a vehicle which: (1) includes a DSRC radio; (2) includes a DSRC-compliant Global Positioning System (GPS) unit; and (3) is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages.

A DSRC-compliant GPS unit is operable to provide positional information for a vehicle (or some other DSRC-equipped device that includes the DSRC-compliant GPS unit) that has lane-level accuracy. In some embodiments, a DSRC-compliant GPS unit is operable to identify, monitor and track its two-dimensional position within 1.5 meters of its actual position 68% of the time under an open sky.

A conventional GPS unit provides positional information that describes a position of the conventional GPS unit with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in on a roadway. Some safety or autonomous driving applications provided by the ADAS system of a modern vehicle require positioning information that describes the geographic position of the vehicle with lane-level accuracy. In addition, the current standard for DSRC requires that the geographic position of the vehicle be described with lane-level accuracy.

DSRC has a range of substantially 500 meters and is designed to be compatible for wirelessly sending and receiving messages among mobile nodes such as vehicles and Roadside Units ("RSU" if singular, "RSUs" if plural).

In some embodiments, devices other than vehicles (e.g., an endpoint that is not a vehicle) may be DSRC-equipped. These DSRC-equipped devices may be used to relay wireless vehicle data to the vehicle via a DSRC message. For example, an RSU or any other communication device may be DSRC-equipped if it includes one or more of the following elements: a DSRC transceiver and any software or hardware necessary to encode and transmit a DSRC message; and a DSRC receiver and any software or hardware necessary to receive and decode a DSRC message.

The embodiments described herein may use V2X communications to transmit and receive wireless messages. As described herein, examples of V2X communications include, but are not limited to, one or more of the following: Dedicated Short Range Communication (DSRC) (including Basic Safety Messages (BSMs) and Personal Safety Messages (PSMs), among other types of DSRC communication); Long-Term Evolution (LTE); millimeter wave (mmWave) communication; 3G; 4G; 5G; LTE-V2X; 5G-V2X; LTE-Vehicle-to-Vehicle (LTE-V2V); LTE-Device-to-Device (LTE-D2D); Voice over LTE (VoLTE); etc. In some examples, the V2X communications can include V2V communications, Vehicle-to-Infrastructure (V2I) communications, Vehicle-to-Network (V2N) communications or any combination thereof.

Examples of a wireless message (e.g., a V2X wireless message) described herein include, but are not limited to, the following messages: a Dedicated Short Range Communication (DSRC) message; a Basic Safety Message (BSM); a Long-Term Evolution (LTE) message; a LTE-V2X message (e.g., a LTE-Vehicle-to-Vehicle (LTE-V2V) message, a LTE-Vehicle-to-Infrastructure (LTE-V2I) message, an LTE-V2N message, etc.); a 5G-V2X message; and a millimeter wave message, etc.

A BSM includes BSM data. The BSM data describes attributes of the vehicle that originally transmitted the BSM. The BSM data describes, among other things, one or more of the following: (1) the path history of the vehicle that transmits the BSM; (2) the speed of the vehicle that transmits the BSM; and (3) the GPS data describing a location of the vehicle that transmits the BSM.

In some embodiments, DSRC-equipped vehicles may probe other DSRC-equipped vehicles/devices along the roadway for information describing their current and future conditions, including their path history, future path, and sensor data they may have received or generated. This information is described as "DSRC probe data." DSRC probe data may include any data received via a DSRC probe or responsive to a DSRC probe.

A DSRC message may include DSRC-based data. The DSRC-based data may include BSM data or DSRC probe data. In some embodiments, the DSRC-based data included in a DSRC message may include BSM data or DSRC probe data received from a plurality of DSRC-equipped vehicles (or other DSRC-equipped devices or endpoints). This BSM data or DSRC probe data may include an identifier of its source and the location of the source or any traffic events described by the BSM data or DSRC probe data.

The BSM data or DSRC probe data may specify which lane a vehicle is traveling in as well as its speed of travel and path history. The BSM data or DSRC probe data may further specify one or more of the following: a velocity of the vehicle at one or more different times or one or more different locations; a heading of the vehicle at one or more different times or one or more different locations; and an acceleration of the vehicle at one or more different times or one or more different locations.

As used herein, the words "geographic location," "location," "geographic position" and "position" refer to a latitude and longitude of an object (or, a latitude, longitude, and elevation of an object) such as a connected vehicle. The example embodiments described herein provide positioning information that describes a geographic position of a vehicle with an accuracy of one or more of: (1) at least plus or minus 1.5 meters in relation to the actual geographic position of the vehicle in 2 dimensions including a latitude and a longitude; and (2) at least plus or minus 3 meters in relation to the actual geographic position of the vehicle in an elevation dimension. Accordingly, the example embodiments described herein are able to describe the geographic position of the vehicle with lane-level accuracy or better.

Vehicle Cloudification

A vehicular micro cloud includes a group of connected vehicles that communicate with one another via V2X messages to provide a location data correction service.

The vehicular micro cloud includes multiple members. A member of the vehicular micro cloud includes a connected vehicle that sends and receives V2X messages via the serverless ad-hock vehicular network. In some embodiments, the members of the serverless ad-hock vehicular network are nodes of the serverless ad-hock vehicular network.

In some embodiments, a serverless ad-hock vehicular network is "serverless" because the serverless ad-hock vehicular network does not include a server. In some embodiments, a serverless ad-hock vehicular network is "ad-hock" because the serverless ad-hock vehicular network is formed its members when it is determined by one or more of the members to be needed or necessary. In some embodiments, a serverless ad-hock vehicular network is "vehicular" because the serverless ad-hock vehicular network only includes connected vehicles as its endpoints. In some embodiments, the term "network" refers to a V2V network.

In some embodiments, the vehicular micro cloud only includes vehicles. For example, the serverless ad-hoc network does not include the following: an infrastructure device, a base station, a roadside device, an edge server, an edge node, and a cloud server. An infrastructure device includes any hardware infrastructure device in a roadway environment such as a traffic signal, traffic light, traffic sign, or any other hardware device that has or does not have the ability to wirelessly communicate with a wireless network.

In some embodiments, the serverless ad-hock vehicular network includes a set of sensor rich vehicles. A sensor rich vehicle is a connected vehicle that includes a rich sensor set. An operating environment that includes the serverless ad-hock vehicular network also includes a legacy vehicle. A legacy vehicle is a connected vehicle that includes a legacy sensor set. The overall sensing ability of the rich sensor set is greater than the overall sensing ability of the legacy sensor set. For example, a roadway environment includes a set of sensor rich vehicles and a legacy vehicle; the rich sensor set is operable to generate sensor measurements that more accurately describe the geographic locations of objects in the roadway environment when compared to the sensor measurements generated by the legacy sensor set.

In some embodiments, the legacy vehicle is an element of the serverless ad-hock vehicular network. In some embodiments, the legacy vehicle is not an element of the serverless ad-hock vehicular network but receives a benefit of a location data correction service for location data that is provided by the members of the serverless ad-hock vehicular network. For example, the legacy vehicle is provided with correction data that enables the legacy vehicle to modify its own sensor data to adjust for variances in the sensor measurements recorded by the legacy sensor set relative to the sensor measurements recorded by the rich sensor sets of the sensor rich vehicles that are included in the serverless ad-hock vehicular network. In this way, the serverless ad-hock vehicular network is operable to improve the operation of the legacy vehicle, which in turn increases the safety of the sensor rich vehicles that are traveling in a vicinity of the legacy vehicle.

In some embodiments, the serverless ad-hock vehicular network is a vehicular micro cloud. It is not a requirement of the embodiments described herein that the serverless ad-hock vehicular network is a vehicular micro cloud. Accordingly, in some embodiments the serverless ad-hock vehicular network is not a vehicular micro cloud.

In some embodiments, the serverless ad-hock vehicular network includes a similar structure is operable to provide some or all of the functionality as a vehicular micro cloud. According, a vehicular micro cloud is now described according to some embodiments to provide an understanding of the structure and functionality of the serverless ad-hock vehicular network according to some embodiments. When describing the vehicular micro cloud, the term "vehicular micro cloud" can be replaced by the term "vehicular micro cloud" since a vehicular micro cloud is an example of a vehicular micro cloud in some embodiments.

Distributed data storage and computing by a group of connected vehicles (i.e., a "vehicular micro cloud") is a promising solution to cope with an increasing network traffic generated for and by connected vehicles. In some embodiments, a vehicular micro cloud is an example of a vehicular micro cloud. Vehicles collaboratively store (or cache) data sets in their onboard data storage devices and compute and share these data sets over vehicle-to-vehicle (V2V) networks as requested by other vehicles. Using vehicular micro clouds removes the need for connected vehicles to access remote cloud servers or edge servers by vehicle-to-network (V2N) communications (e.g., by cellular networks) whenever they need to get access to unused computing resources such as shared data (e.g., high-definition road map for automated driving), shared computational power, shared bandwidth, shared memory, and cloudification services.

Some of the embodiments described herein are motivated by the emerging concept of "vehicle cloudification." Vehicle cloudification means that vehicles equipped with on-board computer unit(s) and wireless communication functionalities form a cluster, called a vehicular micro cloud, and collaborate with other micro cloud members over V2V networks or V2X networks to perform computation, data storage, and data communication tasks in an efficient way. These types of tasks are referred to herein as "network tasks" if plural, or a "network task" if singular.

In some embodiments, a network task includes any computational, data storage, or data communication task collaboratively performed by a plurality of the members of a vehicular micro cloud.

In some embodiments, a computational task includes a processor executing code and routines to output a result. The result includes digital data that describes the output of executing the code and routines. For example, a computational task includes a processor executing code and routines to solve a problem, and the result includes digital data that describes the solution to the problem. In some embodiments, the computational task is broken down into sub-tasks whose completion is equivalent to completion of the computational task. In this way, the processors of a plurality of micro cloud members are assigned different sub-tasks configured to complete the computational task; the micro cloud members take steps to complete the sub-tasks in parallel and share the result of the completion of the sub-task with one another via V2X wireless communication. In this way, the plurality of micro cloud members work together collaboratively to complete the computational task. The processors include, for example, the onboard units or electronic control units (ECUs) of a plurality of connected vehicles that are micro cloud members.

In some embodiments, a data storage task includes a processor storing digital data in a memory of a connected vehicle. For example, a digital data file which is too big to be stored in the memory of any one vehicle is stored in the memory of multiple vehicles. In some embodiments, the data storage task is broken down into sub-tasks whose completion is equivalent to completion of the data storage task. In this way, the processors of a plurality of micro cloud members are assigned different sub-tasks configured to complete the data storage task; the micro cloud members take steps to complete the sub-tasks in parallel and share the result of the completion of the sub-task with one another via V2X wireless communication. In this way, the plurality of micro cloud members work together collaboratively to complete the data storage task. For example, a sub-task for a data storage task includes storing a portion of a digital data file in a memory of a micro cloud member; other micro cloud members are assigned sub-tasks to store the remaining portions of digital data file in their memories so that collectively the entire file is stored across the vehicular micro cloud or a sub-set of the vehicular micro cloud.

In some embodiments, a data communication task includes a processor using some or all of the network bandwidth available to the processor (e.g., via the communication unit of the connected vehicle) to transmit a portion a V2X wireless message to another endpoint. For example, a V2X wireless message includes a payload whose file size is too big to be transmitted using the bandwidth available to any one vehicle and so the payload is broken into segments and transmitted at the same time (or contemporaneously) via multiple wireless messages by multiple micro cloud members. In some embodiments, the data communication task is broken down into sub-tasks whose completion is equivalent to completion of the data storage task. In this way, the processors of a plurality of micro cloud members are assigned different sub-tasks configured to complete the data storage task; the micro cloud members take steps to complete the sub-tasks in parallel and share the result of the completion of the sub-task with one another via V2X wireless communication. In this way, the plurality of micro cloud members work together collaboratively to complete the data storage task. For example, a sub-task for a data communication task includes transmitting a portion of a payload for a V2X message to a designated endpoint; other micro cloud members are assigned sub-tasks to transmit the remaining portions of payload using their available bandwidth so that collectively the entire payload is transmitted.

In some embodiments, a network task is collaboratively performed by the plurality of members executing computing processes in parallel which are configured to complete the execution of the network task.

In some embodiments, a vehicular micro cloud includes a plurality of members that execute computing processes whose completion results in the execution of a network task. For example, the serverless ad-hock vehicular network provides a network task to a legacy vehicle.

Vehicular micro clouds are beneficial, for example, because they help vehicles to perform computationally expensive tasks that they could not perform alone or store large data sets that they could not store alone.

Vehicular micro clouds are described in the patent applications that are incorporated by reference in this paragraph. This patent application is related to the following patent applications, the entirety of each of which is incorporated herein by reference: U.S. patent application Ser. No. 15/358,567 filed on Nov. 22, 2016 and entitled "Storage Service for Mobile Nodes in a Roadway Area"; U.S. patent application Ser. No. 15/799,442 filed on Oct. 31, 2017 and entitled "Service Discovery and Provisioning for a Macro-Vehicular Cloud"; U.S. patent application Ser. No. 15/845,945 filed on Dec. 18, 2017 and entitled "Managed Selection of a Geographical Location for a Micro-Vehicular Cloud"; and U.S. patent application Ser. No. 15/799,963 filed on Oct. 31, 2017 and entitled "Identifying a Geographic Location for a Stationary Micro-Vehicular Cloud."

In some embodiments, a typical use case of vehicular micro clouds is a data storage service, where vehicles in a micro cloud collaboratively keep data contents in their on-board data storage device. The vehicular micro cloud allows vehicles in and around the vehicular micro cloud to request the data contents from micro cloud member(s) over V2V communications, reducing the need to access remote cloud servers by vehicle-to-network (e.g., cellular) communications. For some use cases, micro cloud members may also update the cached data contents on the spot with minimal intervention by remote cloud/edge servers (e.g., updating a high-definition road map based on measurements from on-board sensors). This paragraph is not intended to limit the functionality of the embodiments described herein to data storage. As described herein, the embodiments are operable to provide other vehicular micro cloud tasks in addition to data storage tasks.

The endpoints that are part of the vehicular micro cloud may be referred to herein as "members," "micro cloud members," or "member vehicles." Examples of members include one or more of the following: a connected vehicle; an edge server; a cloud server; any other connected device that has computing resources and has been invited to join the vehicular micro cloud by a handshake process. In some embodiments, the term "member vehicle" specifically refers to only connected vehicles that are members of the vehicular micro cloud whereas the terms "members" or "micro cloud members" is a broader term that may refer to one or more of the following: endpoints that are vehicles; and endpoints that are not vehicles such as roadside units.

In some embodiments, the communication unit of an ego vehicle includes a V2X radio. The V2X radio operates in compliance with a V2X protocol. In some embodiments, the V2X radio is a cellular-V2X radio ("C-V2X radio"). In some embodiments, the V2X radio broadcasts BSMs. In some embodiments, the safety messages broadcast by the communication unit include some or all of the system data as its payload. In some embodiments, the system data is included in part 2 of the safety message as specified by the DSRC protocol. In some embodiments, the payload includes digital data that describes, among other things, sensor data that describes a roadway environment that includes the members of the vehicular micro cloud.

Figure 6:
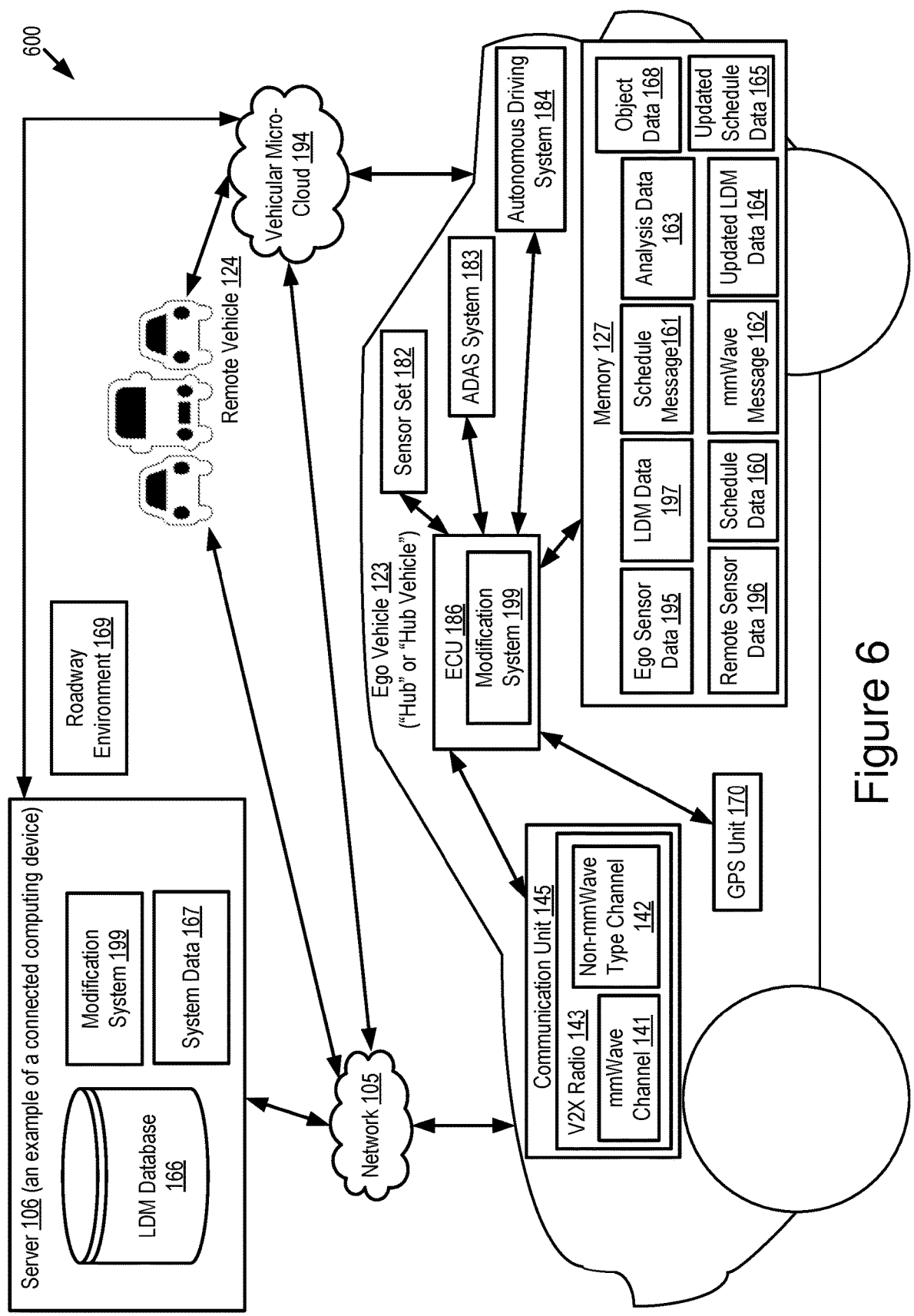
FIG. 6 is another block diagram illustrating an operating environment for a modification system according to some embodiments.

As used herein, the term "vehicle" refers to a connected vehicle. For example, the ego vehicle and remote vehicle depicted in FIGS. 1B and 6 are connected vehicles. A connected vehicle is a conveyance, such as an automobile, that includes a communication unit that enables the conveyance to send and receive wireless messages via one or more vehicular networks. Accordingly, as used herein, the terms "vehicle" and "connected vehicle" may be used interchangeably. The embodiments described herein are beneficial for both drivers of human-driven vehicles as well as the autonomous driving systems of autonomous vehicles.

In some embodiments, the modification system improves the performance of a network because it beneficially takes steps enable the completion of vehicular micro cloud tasks.

In some embodiments, the modification system is software installed in an onboard unit (e.g., an ECU of a vehicle having V2X communication capability. The vehicle is a connected vehicle and operates in a roadway environment with N number of remote vehicles that are also connected vehicles, where N is any positive whole number that is sufficient to satisfy a threshold for forming a vehicular micro cloud. The roadway environment may include one or more of the following example elements: an ego vehicle; N remote vehicles; an edge server; and a roadside unit. For the purpose of clarity, the N remote vehicles may be referred to herein as the "remote vehicle" or the "remote vehicles" and this will be understood to describe N remote vehicles.

An example of a roadway environment according to some embodiments includes the roadway environment 169 depicted in FIG. 6. As depicted, the roadway environment 169 includes objects. Examples of objects include one or of the following: other automobiles, road surfaces; signs, traffic signals, roadway paint, medians, turns, intersections, animals, pedestrians, debris, potholes, accumulated water, accumulated mud, gravel, roadway construction, cones, bus stops, poles, entrance ramps, exit ramps, breakdown lanes, merging lanes, other lanes, railroad tracks, railroad crossings, and any other tangible object that is present in a roadway environment 169 or otherwise observable or measurable by a camera or some other sensor included in the sensor set.

The ego vehicle and the remote vehicles may be human-driven vehicles, autonomous vehicles, or a combination of human-driven vehicles and autonomous vehicles. In some embodiments, the ego vehicle and the remote vehicles may be equipped with DSRC equipment such as a GPS unit that has lane-level accuracy and a DSRC radio that is capable of transmitting DSRC messages.

In some embodiments, the ego vehicle and some or all of the remote vehicles include their own instance of a modification system. For example, in addition to the ego vehicle, some or all of the remote vehicles include an onboard unit having an instance of the modification system installed therein.

In some embodiments, the ego vehicle and one or more of the remote vehicles are members of a vehicular micro cloud. In some embodiments, the remote vehicles are members of a vehicular micro cloud, but the ego vehicle is not a member of the vehicular micro cloud. In some embodiments, the ego vehicle and some, but not all, of the remote vehicles are members of the vehicular micro cloud. In some embodiments, the ego vehicle and some or all of the remote vehicles are members of the same vehicular macro cloud but not the same vehicular micro cloud, meaning that they are members of various vehicular micro clouds that are all members of the same vehicular macro cloud so that they are still interrelated to one another by the vehicular macro cloud.

An example of a vehicular micro cloud according to some embodiments includes the vehicular micro cloud 194 depicted in FIG. 6.

Accordingly, multiple instances of the modification system are installed in a group of connected vehicles. The group of connected vehicles are arranged as a vehicular micro cloud. As described in more detail below, the modification system further organizes the vehicular micro cloud into a set of nano clouds which are each assigned responsibility for completion of a sub-task. Each nano cloud includes at least one member of the vehicular micro cloud so that each nano cloud.

In some embodiments, a nano cloud includes a subset of a vehicular micro cloud that is organized within the vehicular micro cloud as an entity managed by a hub wherein the entity is organized for the purpose of a completing one or more sub-tasks of a vehicular micro cloud task.

In some embodiments, the vehicular micro cloud task is completing a point-to-point mmWave transmission between an ego vehicle and a remote vehicle based on a schedule which is described by the schedule data.

In some embodiments, the ego vehicle and some or all of the remote vehicles are members of the same vehicular macro cloud but not the same nano cloud. In some embodiments, the ego vehicle and some or all of the remote vehicles are members of the same nano cloud.

A nano cloud includes a subset of the members of a vehicular micro cloud. The members of the nano cloud are assigned a sub-task to complete. In some embodiments, the members of the nano cloud are organized to form the nano cloud by a hub; the hub also assigns the members a sub-task to complete and optionally digital data describing instructions for which of the members should complete which aspects of the sub-task.

In some embodiments, each nano cloud includes digital data that describes a roster for that nano cloud. A roster for a particular nano cloud is digital data that describes which of the members of the vehicular micro cloud are assigned to be members of the particular nano cloud.

In some embodiments, a modification system creates a set of nano clouds to perform a plurality of sub-tasks. The plurality of sub-tasks are configured so that their completion will result in a completion of a vehicular micro cloud task. Each nano cloud in the set is assigned at least one sub-task from the plurality to perform. Each nano cloud includes at least one member of the vehicular micro cloud so that each nano cloud includes a membership roster. Different nano clouds in the set include different membership rosters relative to one another.

Hub or Hub Vehicle

In some embodiments, the modification system that executes a method as described herein (e.g., the method 300 depicted in FIG. 3, the method 800 depicted in FIG. 8 the general example method) is an element of a hub or a hub vehicle. For example, the vehicular micro cloud formed by the modification system includes a hub vehicle that provides the following example functionality in addition to the functionality of the methods described herein: (1) controlling when the set of member vehicles leave the vehicular micro cloud (i.e., managing the membership of the vehicular micro cloud, such as who can join, when they can join, when they can leave, etc.); (2) determining how to use the pool of vehicular computing resources to complete a set of tasks in an order for the set of member vehicles wherein the order is determined based on a set of factors that includes safety; (3) determining how to use the pool of vehicular computing resources to complete a set of tasks that do not include any tasks that benefit the hub vehicle; and determining when no more tasks need to be completed, or when no other member vehicles are present except for the hub vehicle, and taking steps to dissolve the vehicular micro cloud responsive to such determinations.

The "hub vehicle" may be referred to herein as the "hub." An example of a hub vehicle according to some embodiments includes the ego vehicle 123 depicted in FIG. 1B and FIG. 6. In some embodiments, a roadway device included in the roadway environment 169 (e.g., a roadside unit that includes the server 106) is the hub of the vehicular micro cloud 194.

In some embodiments, the modification system determines which member vehicle from a group of vehicles (e.g., the ego vehicle and one or more remote vehicles) will serve as the hub vehicle based on a set of factors that indicate which vehicle (e.g., the ego vehicle or one of the remote vehicles) is the most technologically sophisticated. For example, the member vehicle that has the fastest onboard computer may be the hub vehicle. Other factors that may qualify a vehicle to be the hub include one or more of the following: having the most accurate sensors relative to the other members; having the most bandwidth relative to the other members; and having the most memory most unused memory relative to the other members. Accordingly, the designation of which vehicle is the hub vehicle may be based on a set of factors that includes which vehicle has: (1) the fastest onboard computer relative to the other members; (2) the most accurate sensors relative to the other members; (3) the most bandwidth relative to the other members or other network factors such having radios compliant with the most modern network protocols; and (4) most available memory relative to the other members.

In some embodiments, the designation of which vehicle is the hub vehicle changes over time if the modification system determines that a more technologically sophisticated vehicle joins the vehicular micro cloud. Accordingly, the designation of which vehicle is the hub vehicle is dynamic and not static. In other words, in some embodiments the designation of which vehicle from a group of vehicles is the hub vehicle for that group changes on the fly if a "better" hub vehicle joins the vehicular micro cloud. The factors described in the preceding paragraph are used to determine whether a new vehicle would be better relative to the existing hub vehicle.

In some embodiments, the hub vehicle includes a memory that stores technical data. The technical data includes digital data describing the technological capabilities of each vehicle included in the vehicular micro cloud. The hub vehicle also has access to each vehicle's sensor data because these vehicles broadcast V2X messages that include the sensor data as the payload for the V2X messages. An example of such V2X messages include BSMs which include such sensor data in part 2 of their payload. In some embodiments, the technical data is included in the member data which vehicles such as the ego vehicle 123 and the remote vehicle 124 store on their local non-transitory memory and broadcast to one another via BSMs. In some embodiments, the member data also includes the sensor data of the vehicle that transmits the BSM as well as some or all of the other digital data described herein as being an element of the member data.

A vehicle's sensor data is the digital data recorded by that vehicle's onboard sensor set 182. In some embodiments, an ego vehicle's sensor data includes the sensor data recorded by another vehicle's sensor set 182; in these embodiments, the other vehicle transmits the sensor data to the ego vehicle via a V2X communication such as a BSM or some other V2X communication.

In some embodiments, the technical data is an element of the sensor data. In some embodiments, the vehicles distribute their sensor data by transmitting BSMs that includes the sensor data in its payload and this sensor data includes the technical data for each vehicle that transmits a BSM; in this way, the hub vehicle receives the technical data for each of the vehicles included in the vehicular micro cloud.

In some embodiments, the hub vehicle is whichever member vehicle of a vehicular micro cloud has a fastest onboard computer relative to the other member vehicles.

In some embodiments, the modification system is operable to provide its functionality to operating environments and network architectures that do not include a server. Use of servers is problematic because they create latency. For example, some prior art systems require that groups of vehicles relay all their messages to one another through a server. By comparison, the use of server is an optional feature in for the modification system. For example, the modification system is an element of a roadside unit that includes a communication unit 145 but not a server. In another example, the modification system is an element of another vehicle such as one of the remote vehicles 124.

In some embodiments, the modification system is operable to provide its functionality even though the vehicle which includes the modification system does not have a Wi-Fi antenna as part of its communication unit. By comparison, some of the existing solutions require the use of a Wi-Fi antenna in order to provide their functionality. Because the modification system does not require a Wi-Fi antenna, it is able to provide its functionality to more vehicles, including older vehicles without Wi-Fi antennas.

In some embodiments, the modification system is operable to provide its functionality even though the vehicle which includes the modification system does not have a V2X radio as part of its communication unit. By comparison, some of the existing solutions require the use of a V2X radio in order to provide their functionality. Because the modification system does not require a V2X radio, it is able to provide its functionality to more vehicles, including older vehicles without V2X radios.

In some embodiments, the modification system includes code and routines that, when executed by a processor, cause the processor to control when a member of the vehicular micro cloud may leave or exit the vehicular micro cloud. This approach is beneficial because it means the hub vehicle has certainty about how much computing resources it has at any given time since it controls when vehicles (and their computing resources) may leave the vehicular micro cloud. The existing solutions do not provide this functionality.

In some embodiments, the modification system includes code and routines that, when executed by a processor, cause the processor to designate a particular vehicle to serve as a hub vehicle responsive to determining that the particular vehicle has sufficient unused computing resources and/or trustworthiness to provide micro cloud services to a vehicular micro cloud using the unused computing resources of the particular vehicle. This is beneficial because it guarantees that only those vehicles having something to contribute to the members of the vehicular micro cloud may join the vehicular micro cloud.

In some embodiments, the modification system manages the vehicular micro cloud so that it is accessible for membership by vehicles which do not have V2V communication capability. This is beneficial because it ensures that legacy vehicles have access to the benefits provided by the vehicular micro cloud. The existing approaches to task completion by a plurality of vehicles do not provide this functionality.

In some embodiments, the modification system is configured so that a particular vehicle (e.g., the ego vehicle) is pre-designated by a vehicle manufacturer to serve as a hub vehicle for any vehicular micro cloud that it joins. The existing approaches to task completion by a plurality of vehicles do not provide this functionality.

The existing solutions generally do not include vehicular micro clouds. Some groups of vehicles (e.g., cliques, platoons, etc.) might appear to be a vehicular micro cloud when they in fact are not a vehicular micro cloud. For example, in some embodiments a vehicular micro cloud requires that all its members share it unused computing resources with the other members of the vehicular micro cloud. Any group of vehicles that does not require all its members to share their unused computing resources with the other members is not a vehicular micro cloud.

In some embodiments, a vehicular micro cloud does not require a server and preferably would not include one because of the latency created by communication with a server. Accordingly, any group of vehicles that includes a server or whose functionality incorporates a server is not a vehicular micro cloud as this term is used herein.

In some embodiments, a vehicular micro cloud formed by a modification system is operable to harness the unused computing resources of many different vehicles to perform complex computational tasks that a single vehicle alone cannot perform due to the computational limitations of a vehicle's onboard vehicle computer which are known to be limited. Accordingly, any group of vehicles that does harness the unused computing resources of many different vehicles to perform complex computational tasks that a single vehicle alone cannot perform is not a vehicular micro cloud.

In some embodiments, a vehicular micro cloud can include vehicles that are parked, vehicles that are traveling in different directions, infrastructure devices, or almost any endpoint that is within communication range of a member of the vehicular micro cloud.

In some embodiments, the modification system is configured so that vehicles are required to have a predetermined threshold of unused computing resources to become members of a vehicular micro cloud. Accordingly, any group of vehicles that does not require vehicles to have a predetermined threshold of unused computing resources to become members of the group is not a vehicular micro cloud in some embodiments.

In some embodiments, a hub of a vehicular micro cloud is pre-designated by a vehicle manufacturer by the inclusion of one a bit or a token in a memory of the vehicle at the time of manufacture that designates the vehicle as the hub of all vehicular micro clouds which it joins. Accordingly, if a group of vehicles does not include a hub vehicle having a bit or a token in their memory from the time of manufacture that designates it as the hub for all groups of vehicles that it joins, then this group is not a vehicular micro cloud in some embodiments.

A vehicular micro cloud is not a V2X network or a V2V network. For example, neither a V2X network nor a V2V network include a cluster of vehicles in a same geographic region that are computationally joined to one another as members of a logically associated cluster that make available their unused computing resources to the other members of the cluster. In some embodiments, any of the steps of a method described herein (e.g., the method depicted in FIG. 3) is executed by one or more vehicles which are working together collaboratively using V2X communications for the purpose of completing one or more steps of the method(s). By comparison, solutions which only include V2X networks or V2V networks do not necessarily include the ability of two or more vehicles to work together collaboratively to complete one or more steps of a method.

In some embodiments, a vehicular micro cloud includes vehicles that are parked, vehicles that are traveling in different directions, infrastructure devices, or almost any endpoint that is within communication range of a member of the vehicular micro cloud. By comparison, a group of vehicles that exclude such endpoints as a requirement of being a member of the group are not vehicular micro clouds according to some embodiments.

In some embodiments, a vehicular micro cloud is operable to complete computational tasks itself, without delegation of these computational tasks to a cloud server, using the onboard vehicle computers of its members; this is an example of a vehicular micro cloud task according to some embodiments. In some embodiments, a group of vehicles which relies on a cloud server for its computational analysis, or the difficult parts of its computational analysis, is not a vehicular micro cloud. Although FIGS. 1B and 6 depict a server in an operating environment that includes the modification system, the server is an optional feature of the operating environment. An example of a preferred embodiment of the modification system does not include the server in the operating environment which includes the modification system.

In some embodiments, the modification system enables a group of vehicles to perform computationally expensive tasks that could not be completed by any one vehicle in isolation.

In some embodiments, each nano cloud included in a vehicular micro cloud includes its own hub which is responsible for organizing the operation of the members that are included in that particular nano cloud. For example, the hub of a nano cloud is responsible for maintaining and updating the roster for the hub, monitoring the performance of the sub-task, monitoring the efficiency of the completion of the sub-task, monitoring when members join or leave the vehicular micro cloud, communicating with other hubs of nano clouds to facilitate updates to the roster of the nano clouds to optimize performance of the sub-task or compensate for changes of circumstance caused by the membership in the vehicular micro cloud changing.

Cellular Vehicle to Everything (C-V2X)

A DSRC-equipped device is any processor-based computing device that includes a DSRC transmitter and a DSRC receiver. For example, if a vehicle includes a DSRC transmitter and a DSRC receiver, then the vehicle may be described as "DSRC-enabled" or "DSRC-equipped." Other types of devices may be DSRC-enabled. For example, one or more of the following devices may be DSRC-equipped: an edge server; a cloud server; a RSU; a traffic signal; a traffic light; a vehicle; a smartphone; a smartwatch; a laptop; a tablet computer; a personal computer; and a wearable device.

In some embodiments, one or more of the connected vehicles described above are DSRC-equipped vehicles. A DSRC-equipped vehicle is a vehicle that includes a standard-compliant GPS unit and a DSRC radio which is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages on a band that is reserved for DSRC messages.

A DSRC message is a wireless message that is specially configured to be sent and received by highly mobile devices such as vehicles, and is compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Commmunication (DSRC)—DSRC profiles for RTTT applications (review); EN ISO 14906:2004 Electronic Fee Collection—Application interface.

A DSRC message is not any of the following: a WiFi message; a 3G message; a 4G message; an LTE message; a millimeter wave communication message; a Bluetooth message; a satellite communication; and a short-range radio message transmitted or broadcast by a key fob at 315 MHz or 433.92 MHz. For example, in the United States, key fobs for remote keyless systems include a short-range radio transmitter which operates at 315 MHz, and transmissions or broadcasts from this short-range radio transmitter are not DSRC messages since, for example, such transmissions or broadcasts do not comply with any DSRC standard, are not transmitted by a DSRC transmitter of a DSRC radio and are not transmitted at 5.9 GHz. In another example, in Europe and Asia, key fobs for remote keyless systems include a short-range radio transmitter which operates at 433.92 MHz, and transmissions or broadcasts from this short-range radio transmitter are not DSRC messages for similar reasons as those described above for remote keyless systems in the United States.

In some embodiments, a DSRC-equipped device (e.g., a DSRC-equipped vehicle) does not include a conventional global positioning system unit ("GPS unit"), and instead includes a standard-compliant GPS unit. A conventional GPS unit provides positional information that describes a position of the conventional GPS unit with an accuracy of plus or minus 10 meters of the actual position of the conventional GPS unit. By comparison, a standard-compliant GPS unit provides GPS data that describes a position of the standard-compliant GPS unit with an accuracy of plus or minus 1.5 meters of the actual position of the standard-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in even when the roadway has more than one lanes of travel each heading in a same direction.

In some embodiments, a standard-compliant GPS unit is operable to identify, monitor and track its two-dimensional position within 1.5 meters, in all directions, of its actual position 68% of the time under an open sky.

GPS data includes digital data describing the location information outputted by the GPS unit. An example of a standard-compliant GPS unit according to some embodiments includes the standard-compliant GPS unit 170 depicted in FIGS. 1B and 6.

In some embodiments, the connected vehicle described herein, and depicted in FIG. 1, includes a V2X radio instead of a DSRC radio. In these embodiments, all instances of the term DSRC" as used in this description may be replaced by the term "V2X." For example, the term "DSRC radio" is replaced by the term "V2X radio," the term "DSRC message" is replaced by the term "V2X message," and so on.

Currently, 75 MHz of the 5.9 GHz band is designated for DSRC. However, in some embodiments, the lower 45 MHz of the 5.9 GHz band (specifically, 5.85-5.895 GHz) is reserved by a jurisdiction (e.g., the United States) for unlicensed use (i.e., non-DSRC and non-vehicular related use) whereas the upper 30 MHz of the 5.9 GHz band (specifically, 5.895-5.925 GHz) is reserved by the jurisdiction for Cellular Vehicle to Everything (C-V2X) use. In these embodiments, the V2X radio depicted in FIG. 1 is a C-V2X radio which is operable to send and receive C-V2X wireless messages on the upper 30 MHz of the 5.9 GHz band (i.e., 5.895-5.925 GHz). In these embodiments, the modification system 199 is operable to cooperate with the C-V2X radio and provide its functionality using the content of the C-V2X wireless messages.

In some of these embodiments, some or all of the digital data depicted in FIG. 1 is the payload for one or more C-V2X messages. In some embodiments, the C-V2X message is a BSM.

In some embodiments, instances of the term "DSRC" as used herein may be replaced by the term "C-V2X." For example, the term "DSRC radio" is replaced by the term "C-V2X radio," the term "DSRC message" is replaced by the term "C-V2X message," and so on.

In some embodiments, instances of the term "V2X" as used herein may be replaced by the term "C-V2X."

Vehicular Network

The modification system utilizes a vehicular network in some embodiments. A vehicular network includes, for example, one or more of the following: V2V; V2X; vehicle-to-network-to-vehicle (V2N2V); vehicle-to-infrastructure (V2I); cellular-V2X (C-V2X); any derivative or combination of the networks listed herein; and etc.

In some embodiments, the modification system includes software installed in an onboard unit of a connected vehicle. This software is the "modification system" described herein.

An example operating environment for the embodiments described herein includes an ego vehicle and, optionally, one or more remote vehicles. The ego vehicle the remote vehicle are connected vehicles having communication units that enable them to send and receive wireless messages via one or more vehicular networks. In some embodiments, the ego vehicle and the remote vehicle include an onboard unit having a modification system stored therein. An example of a preferred embodiment of the modification system includes a serverless operating environment. A serverless operating environment is an operating environment which includes at least one modification system and does not include a server.

Figure 3:
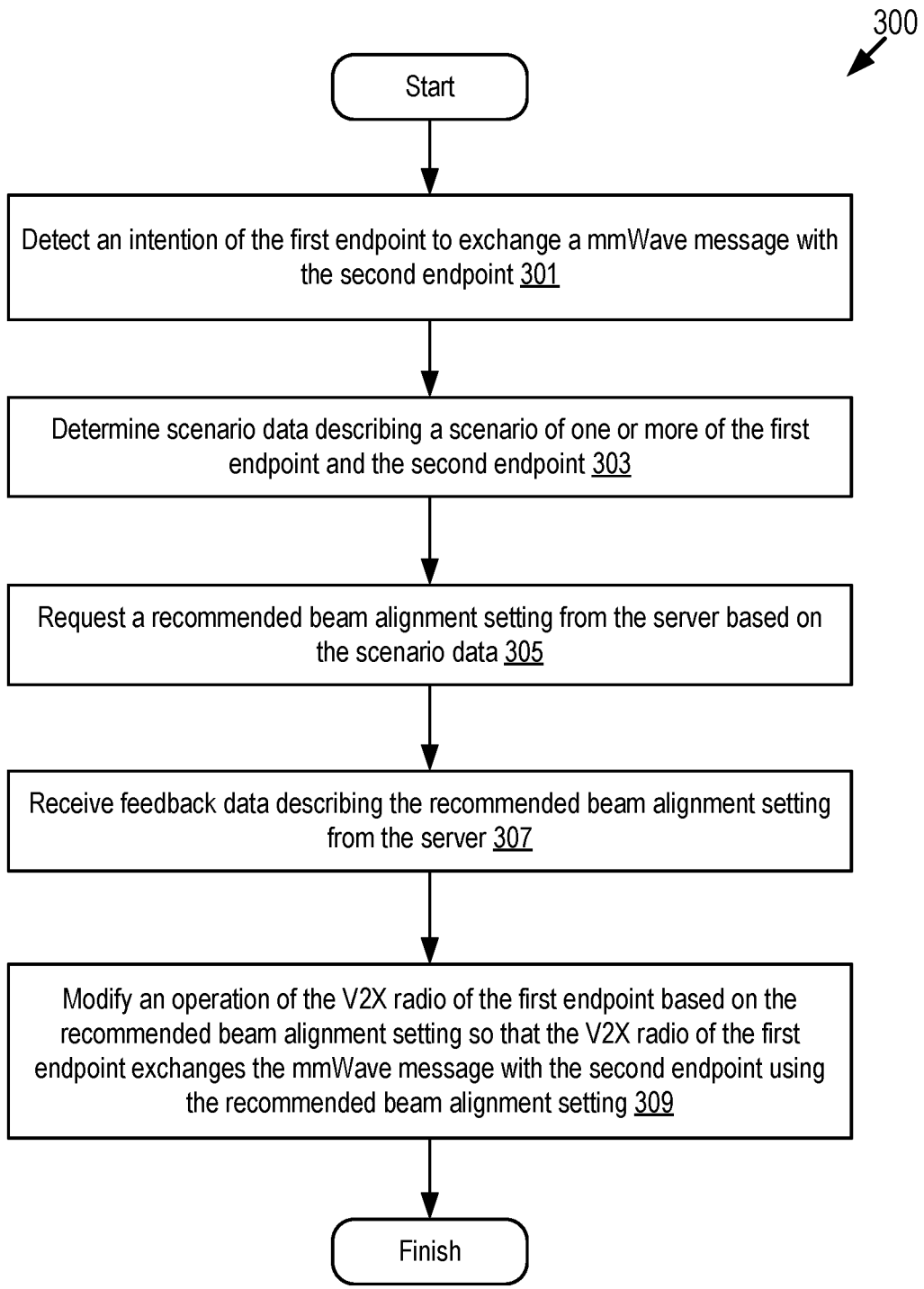
FIG. 3 depicts a method for modifying a V2X radio of a first endpoint based on beam alignment feedback data according to some embodiments.

In some embodiments, the modification system includes code and routines that are operable, when executed by a processor of the onboard unit, to cause the processor to execute one or more of the steps of the method 300 depicted in FIG. 3 or any other method described herein.

In some embodiments, this application is related to U.S. patent application Ser. No. 15/644,197 filed on Jul. 7, 2017 and entitled "Computation Service for Mobile Nodes in a Roadway Environment," the entirety of which is hereby incorporated by reference.

Example General Method

In some embodiments, the modification system includes code and routines that are operable to execute any of the methods described herein. An example general method is now described according to some embodiments.

An ego vehicle stores digital data that describes a local dynamic map (LDM). LDM data includes digital data that describes an LDM. An LDM describes information about the endpoints of a network in a roadway environment. For example, the LDM includes one or more of the following for the endpoints (e.g., connected vehicles) in the roadway environment: location data; speed data; time data; weather data; relative data; endpoint data; beam data; scenario data; feedback data; and sensor data (e.g., ego sensor data 195 and remote sensor data 196). Examples of these types of digital data according to some embodiments is described below with reference to FIGS. 1-8. An example of the LDM data according to some embodiments includes the LDM data 197 depicted in FIG. 6. The LDM data is updated over time as new information is acquired or determined by analysis by the modification system; this updated LDM data is the updated LDM data. An example of the updated LDM data includes the updated LDM data 164 depicted in FIG. 6.

Sharing sensor data between vehicles can significantly enhance the perception capability of each vehicle. Examples of sensor data include one or more of the following: location data; speed data; time data; weather data; relative data; endpoint data; beam data; scenario data; feedback data; ego sensor data; and remote sensor data. A vehicle can use sensor data to update its LDM. mmWave communications can support a high data rate. However, mmWave communications are point-to-point. One beneficial approach is to schedule mmWave communications between vehicles so that beam alignment is achieved and the mmWave communication is successfully completed. The scheduling is complicated in problematic. The embodiments of the example general method solve this problem.

The steps of the example general method can be executed in any order. In some embodiments, some the steps of the example general method are omitted. The steps are now described according to some embodiments.

Step 1: At time t, collect information for updating the LDM which is described by the LDM data. The information can be collected, for example, from one or more of the following sources: (1) LDM at time t31 1; (2) local sensor measurements; (3) high-level summary of detected objects received from neighboring vehicles; and (4) rich raw sensor data shared by neighboring vehicles.

In some embodiments, the LDM at time t−1 is described by the LDM data 197.

In some embodiments, the local sensor measurements are described by the ego sensor data 195. The ego sensor data 195 includes digital data that describes any of the sensor measurements recorded by the sensor set 182 of the ego vehicle 123.

In some embodiments, the high-level summary of detected objects received from neighboring vehicles is described by the object data. For example, the remote vehicles broadcast V2X messages (e.g., BSMs) that include digital data that describes the objects that are detected by the remote vehicles based on the sensor measurements recorded by the sensor set 182 of the remote vehicles. An example of the object data according to some embodiments includes the object data 168 depicted in FIG. 6.

In some embodiments, the rich raw sensor data shared by neighboring vehicles is described by the remote sensor data. For example, the remote vehicles include sensor sets that record sensor measurements. The remote sensor data includes digital data that describes these sensor measurements. In some embodiments, these sensor measurements are shared by the remote vehicles with the ego vehicle via V2X messages (e.g., BSMs) that are transmitted by the remote vehicle to the ego vehicle. An example of the remote sensor data according to some embodiments includes the remote sensor data 196 depicted in FIG. 6. The remote sensor data includes any sensor measurements recorded by the sensor set of one or more remote vehicles.

Step 2: Update the LDM described by the LDM data based on the collected information from step 1.

In some embodiments, the LDM data describes, among other things, a map of the roadway environment. The LDM is partitioned into small cells. Each cell is assigned a state such as "occupied" or "not occupied." In some embodiments, the state is determined based on a probability which is calculated using the collected information from step 1. In some embodiments, the modification system uses the collected information from step 1 to determine a posterior probability of each cell being occupied. Step 2 includes, among other things, the determination of this probability and its inclusion in the LDM data.

In some embodiments, the output of step 2 is the updated LDM data. The updated LDM data includes digital data that describes a version of the LDM which is updated to include the probabilities on a cell-by-cell basis. An example of the updated LDM data according to some embodiments includes the updated LDM data 164 depicted in FIG. 6.

Step 3: Analyze the updated LDM data to identify, based on the updated LDM, the information still needed to further complete the updated LDM. For example, the modification system analyzes the updated LDM to identify one or more of the following: cells, or regions of cells, whose state is still unknown LDM that are still unknown; and cells that require more information to reduce the uncertainty of their states.

In some embodiments, the output of step 3 is the analysis data. The analysis data includes digital data that describes, for an updated LDM, information still needed to further complete the updated LDM. An example of the analysis data according to some embodiments includes the analysis data 163 depicted in FIG. 6.

Step 4: Use machine learning techniques to generate a millimeter wave transmission schedule. In some embodiments, the modification system includes a machine learning module that is operable to execute one or more machine learning techniques using the updated LDM data 164 and the analysis data 163 as inputs with the output being schedule data. The schedule data includes digital data that describes a schedule for when particular mmWave messages should be transmitted to particular remote vehicles by the ego vehicle. An example of the schedule data according to some embodiments includes the schedule data 160 depicted in FIG. 6.

In some embodiments, the schedule data includes digital data that describes a schedule that describes times and locations for transmitting a mmWave message by a V2X radio of an ego vehicle on a point-to-point basis between the ego vehicle a the remote vehicle.

An example of the machine learning module includes a reinforcement learning scheduling algorithm with machine learning which includes code and routines that are operable, when executed by a processor, to cause the processor to receive the updated LDM data and/or the analysis data as inputs and analyzes this data to: predict neighboring vehicles' positions; predict quality of communication links between ego vehicle and neighboring vehicles; assess usefulness of neighboring vehicles' sensor data (e.g., how well can this data help reduce unknown regions in the ego vehicle's LDM); and generate a communications schedule that optimizes usefulness of sensor data to further complete the ego vehicle's LDM. The output of this algorithm is the schedule data.

Figure 7:
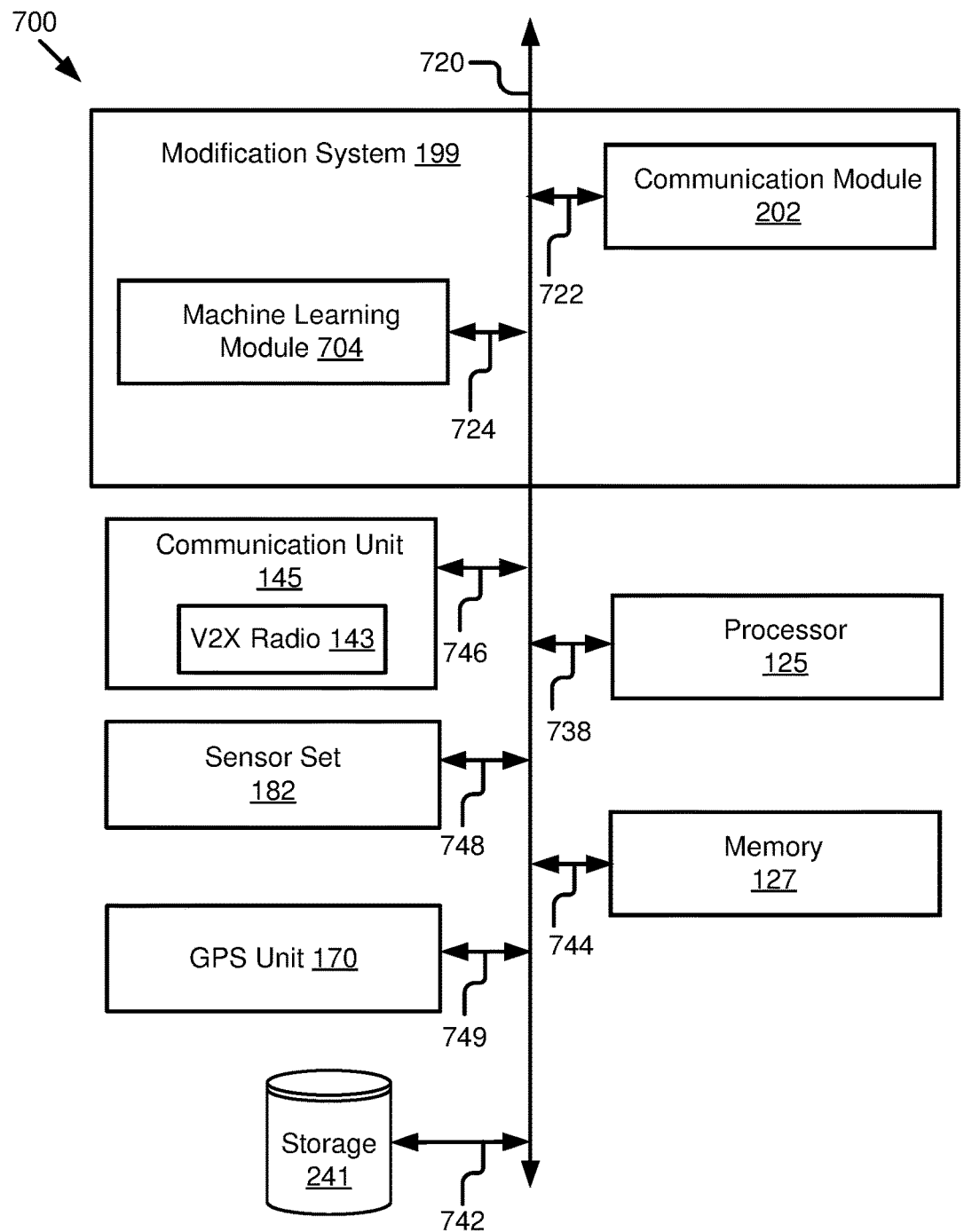
FIG. 7 is a block diagram illustrating an example computer system including a modification system according to some embodiments.

An example of the machine learning module according to some embodiments includes the machine learning module 704 depicted in FIG. 7.

In some embodiments, the machine learning module includes a reinforcement learning scheduling algorithm with machine learning which is executed by a processor and causes the processor to execute a machine learning process using the local dynamic map as an input to the machine learning process which outputs schedule data describing a schedule. In some embodiments, the schedule is provided to the V2X radio to modify the operation of the V2X radio so that a mmWave message is transmitted by the V2X radio in compliance with the schedule.

An example of a suitable reinforcement learning scheduling algorithm with machine learning includes, among other things, a Deep Q-network algorithm. For example, in some embodiments the reinforcement learning scheduling algorithm includes a Q-learning algorithm using a Markov decision process.

In some embodiments, the schedule data is generated by the modification system based at least in part on a set of digital twin simulations which are executed by the modification system.

In some embodiments, the ego vehicle includes a sensor set. The sensors of the sensor set are operable to collect ego sensor data. The sensors of the sensor set include any sensors that are necessary to measure and record the measurements described by the ego sensor data. In some embodiments, the sensor data includes any sensor measurements that are necessary to generate the other digital data stored by the memory 127. In some embodiments, the ego sensor data 195 includes digital data that describes any sensor measurements that are necessary for the modification system to provide its functionality as described herein with reference to the method described herein.

In some embodiments, the sensor set includes any sensors that are necessary to record ego sensor data that describes the roadway environment in sufficient detail to create a digital twin of the roadway environment. In some embodiments, the modification system generates the schedule described by the schedule data based at least in part on the outcomes observed by the modification system during the execution of a set of digital twins that simulate the real-life circumstances of the ego vehicle.

For example, in some embodiments the modification system includes simulation software. The simulation software is any simulation software that is capable of simulating an execution of a vehicular micro cloud task by the vehicular micro cloud. The vehicular micro cloud task includes, for example, the transmission of a mmWave message in compliance with a schedule. For example, the simulation software is a simulation software that is capable of conducting a digital twin simulation. In some embodiments, the vehicular micro cloud is divided into a set of nano clouds.

A digital twin is a simulated version of a specific real-world vehicle that exists in a simulation. A structure, condition, behavior, and responses of the digital twin are similar to a structure, condition, behavior, and responses of the specific real-world vehicle that the digital twin represents in the simulation. The digital environment included in the simulation is similar to the real-world roadway environment 169 of the real-world vehicle (e.g., the ego vehicle, the remote vehicle, other vehicles in the roadway environment). The simulation software includes code and routines that are operable to execute simulations based on digital twins of real-world vehicles in the roadway environment.

In some embodiments, the simulation software is integrated with the modification system. In some other embodiments, the simulation software is a standalone software that the modification system can access to execute digital twin simulations to determine the best way to divide the vehicular micro cloud 194 into nano clouds and which sub-tasks to assign which nano clouds. The digital twin simulations may also be used by the modification system to determine how to break down the vehicular micro cloud task into sub-tasks.

Digital twins, and an example process for generating and using digital twins which is implemented by the modification system in some embodiments, are described in U.S. patent application Ser. No. 16/521,574 entitled "Altering a Vehicle based on Driving Pattern Comparison" filed on Jul. 24, 2019, the entirety of which is hereby incorporated by reference.

Step 5: Build a schedule message. A schedule message includes a V2X message (but not a mmWave message) that includes the schedule data as its payload. The schedule message beneficially informs remote vehicles about the schedule that the modification system of the ego vehicle will following when transmitting mmWave messages. An example of the schedule message according to some embodiments includes the schedule message 161 depicted in FIG. 6.

Step 6: Transmit the schedule message. In some embodiments, this transmission is broadcast. In some embodiments, this transmission is unicast.

Step 7: Modify the operation of a mmWave radio of the ego vehicle so that it transmits mmWave messages in compliance with the schedule described by the schedule data.

Step 8: Build the mmWave messages. An example of a mmWave message according to some embodiments includes the mmWave message 162 depicted in FIG. 6.

Step 9: Transmit the mmWave message to the remote vehicles in compliance with the schedule described by the schedule data.

Step 10: Analyze the rate of successfully completed mmWave messages at step 9 and adjust the schedule data as needed to achieve a higher success rate. A mmWave message is successful if the intended recipient receives it. The output of step 10 is updated schedule data. An example of the updated schedule data includes the updated schedule data 165 depicted in FIG. 6.

Step 11: Repeat steps 5-9 using the updated schedule data 165 instead of the schedule data 160.

In some embodiments, each vehicle included in the roadway environment that includes an instance of the modification system executes the example general method. In some embodiments, some but not all of the vehicles included in the roadway environment that includes an instance of the modification system executes the example general method.

In some embodiments, this application is related to U.S. patent application Ser. No. 16/254,801 filed on Jan. 23, 2019 and entitled "Modifying a Millimeter Wave Radio based on a Beam Alignment Feedback," the entirety of which is herein incorporated by reference.

Example Embodiments

Figure 1B:
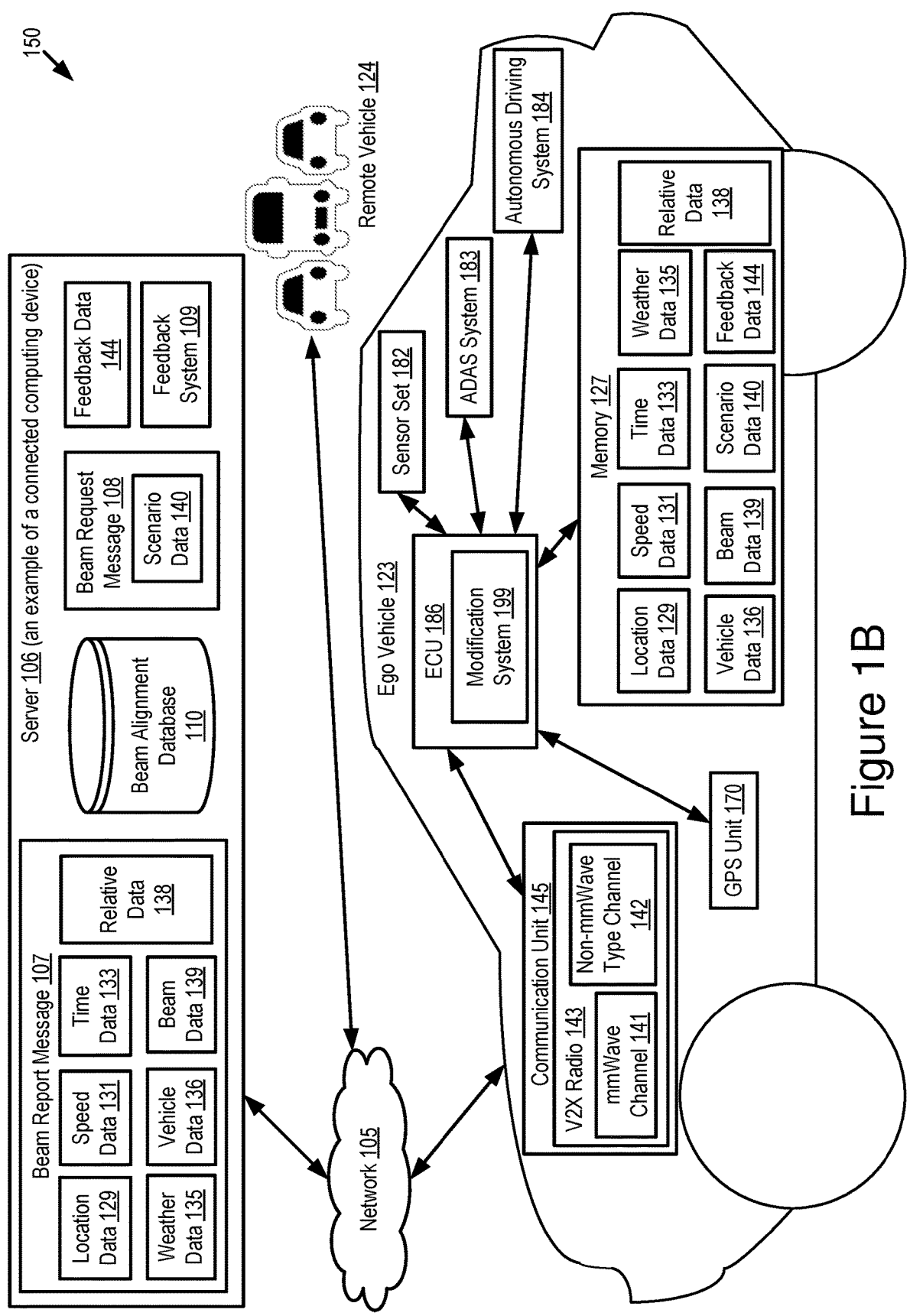
FIG. 1B is another block diagram illustrating an operating environment for a modification system and a feedback system according to some embodiments.

Referring to FIG. 1A, depicted is an operating environment 100 for a modification system 199 according to some embodiments. The operating environment 100 may include one or more of the following elements: a first endpoint 101; a second endpoint 103; a third endpoint 104; and a server 106. These elements of the operating environment 100 may be communicatively coupled to a network 105. Although not depicted in FIG. 1A, the operation environment 100 may include one or more RSUs that are DSRC-enabled. The one or more DSRC-enabled RSUs may relay wireless messages among the first endpoint 101, the second endpoint 103, the third endpoint 104 and the server 106 via the network 105. For example, the range of DSRC transmissions is generally about 500 meters, and so, if the second endpoint 103 is 700 meters away from the first endpoint 101, then one or more intervening DSRC-enabled RSUs may relay a DSRC message from the second endpoint 103 to the first endpoint 101 or from the first endpoint 101 to the second endpoint 103.

Although three endpoints and one network 105 are depicted in FIG. 1A, in practice the operating environment 100 may include any number of endpoints and any number of networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2V, LTE-V2X, LTE-D2D, VoLTE, 5G-V2X or any other mobile data network or combination of mobile data networks. Further, the network 105 may include one or more IEEE 802.11 wireless networks.

In some embodiments, the network 105 is a V2X network, which is a wireless network for sending and receiving V2X wireless messages among various endpoints (e.g., vehicles, roadside equipment, etc.) that each include a V2X radio. Each of the channels of the V2X radio may transmit and receive different types of V2X messages. For example, V2X channel #1 may transmit and receive mmWave messages, whereas V2X channel #2 may transmit and receive non-mmWave type V2X messages, such as one of the following: DSRC; LTE-V2X; 5G-V2X; ITS-G5 in Europe; ITS-Connect; or some other type of V2X communication that does not include mmWave. In some embodiments, each endpoint may include multiple V2X radios, including a first V2X radio (e.g., a non-mmWave radio) used for transmitting and receiving non-mmWave messages and a second V2X radio (e.g., a mmWave radio) used for transmitting and receiving mmWave messages.

In some embodiments, the network 105 includes a C-V2X network.

Different non-mmWave types of V2X communication can be used in different countries. For example, if the modification system is implemented in the United States, then DSRC may be ideal for use as the non-mmWave type of V2X communication. If the modification system is implemented in Japan, then ITS-Connect may be ideal for use as the non-mmWave type of V2X communication. If the modification system is implemented in China, then LTE-V2X may be ideal for use as the non-mmWave type of V2X communication.

The first endpoint 101, the second endpoint 103 and the third endpoint 104 can be any communication devices in a roadway environment. For example, each of the first endpoint 101, the second endpoint 103 and the third endpoint 104 can be a vehicle (e.g., a connected vehicle with a communication unit described below), a roadside unit, a base station, or any other infrastructure device. The first endpoint 101, the second endpoint 103 and the third endpoint 104 may have a similar structure and provide similar functionality, and the description provided below for the first endpoint 101 may also be applicable to the second endpoint 103 and the third endpoint 104.

The first endpoint 101 may include one or more of the following elements: a processor 125; a memory 127; a communication unit 145; a GPS unit 170; a sensor set 182; an Advanced Driver-Assistance System (ADAS system) 183; an autonomous driving system 184; an onboard unit 185; and the modification system 199. These elements of the first endpoint 101 may be communicatively coupled to one another via a bus.

In some embodiments, the processor 125 and the memory 127 may be elements of an onboard vehicle computer system (such as computer system 200 described below with reference to FIG. 2). The onboard vehicle computer system may be operable to cause or control the operation of the modification system 199. The onboard vehicle computer system may be operable to access and execute the data stored on the memory 127 to provide the functionality described herein for the modification system 199 or its elements (see, e.g., FIG. 2).

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The first endpoint 101 may include one or more processors 125. Other processors, operating systems, sensors, displays, and physical configurations may be possible.

The memory 127 stores instructions or data that may be executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The first endpoint 101 may include one or more memories 127.

The memory 127 of the first endpoint 101 may store one or more of the following elements: location data 129; speed data 131; time data 133; weather data 135; endpoint data 137; relative data 138; beam data 139; scenario data 140; and feedback data 144.

The location data 129 includes digital data that describes a geographic location of the first endpoint 101 as determined by one or more onboard sensors of the first endpoint 101. For example, the location data 129 includes GPS data describing the geographic location of the first endpoint 101 with a lane-level accuracy, e.g., an accuracy of plus or minus 3 meters as required by the DSRC standard.

The speed data 131 includes digital data describing a speed, an acceleration, or a combination thereof of the first endpoint 101.

The time data 133 includes digital data describing a time when the first endpoint 101 is present at the geographic location described by the location data 129. For example, the time data 133 describes a time of day and a day of week when the first endpoint 101 is present at the geographic location described by the location data 129.

The weather data 135 includes digital data describing one or more weather conditions at the geographic location described by the location data 129. Example weather conditions include, but are not limited to, windy, rainy, sunny, icy, foggy, cloudy, etc.

The endpoint data 137 includes digital data describing one or more of the first endpoint 101, the second endpoint 103 and the third endpoint 104. For example, the first endpoint 101, the second endpoint 103 and the third endpoint 104 are vehicles, and the endpoint data 137 is vehicle data that describes one or more of a make and model of the first endpoint 101, a make and model of the second endpoint 103, and a make and model of the third endpoint 104.

The relative data 138 includes digital data describing a parameter of another endpoint relative to the first endpoint 101. For example, the relative data 138 includes digital data describing one or more of a location of the second endpoint 103 relative to the first endpoint 101, a speed of the second endpoint 103 relative to the first endpoint 101 and an acceleration of the second endpoint 103 relative to the first endpoint 101. In another example, the relative data 138 includes digital data describing one or more of a location of the third endpoint 104 relative to the first endpoint 101, a speed of the third endpoint 104 relative to the first endpoint 101 and an acceleration of the third endpoint 104 relative to the first endpoint 101.

The beam data 139 includes digital data describing one or more results of a beam alignment training between the first endpoint 101 and another endpoint. For example, the beam data 139 includes one or more of: a list of candidate beam pairs being trained between the first endpoint 101 and another endpoint (e.g., the second endpoint 103 or the third endpoint 104); a received signal strength for each candidate beam pair being trained; and a data rate achieved by each candidate beam pair.

The scenario data 140 includes digital data describing a scenario of one or more of the first endpoint 101 and another endpoint. In some embodiments, the scenario data 140 includes one or more of: the location data 129; the speed data 131; the time data 133; the weather data 135; the relative data 138; and the endpoint data 137.

The feedback data 144 includes digital data describing a recommended beam alignment setting that is determined by the server 106 based on the scenario data 140. The feedback data 144 is described below in more detail.

The communication unit 145 transmits and receives data to and from the network 105 or to another communication channel. In some embodiments, the communication unit 145 may include a DSRC transceiver, a DSRC receiver and other hardware or software necessary to make the first endpoint 101 a DSRC-enabled device. For example, the communication unit 145 includes a DSRC antenna configured to broadcast DSRC messages via the network. The DSRC antenna may also transmit BSM messages at a fixed or variable interval (e.g., every 0.1 seconds, at a time interval corresponding to a frequency range from 1.6 Hz to 10 Hz, etc.) that is user configurable.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471, 387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System."

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

The communication unit 145 includes a V2X radio 143. The V2X radio 143 is an electronic device that includes a V2X transmitter and a V2X receiver and is operable to send and receive wireless messages via any V2X protocol. For example, the V2X radio 143 is operable to send and receive wireless messages via DSRC. The V2X transmitter is operable to transmit and broadcast DSRC messages over the 5.9 GHz band. The V2X receiver is operable to receive DSRC messages over the 5.9 GHz band.

The V2X radio 143 includes multiple channels including an mmWave channel 141 and a non-mmWave type channel 142. The mmWave channel 141 is used for performing mmWave communications. The non-mmWave type channel 142 is used for performing non-mmWave type communications (e.g., DSRC communications or any other type of V2X communications that does not include mmWave).

In some embodiments, the V2X radio 143 includes a C-V2X radio. For example, the non-mmWave type channel 142 transmits using a C-V2X channel of the C-V2X radio.

In some embodiments, the communication unit 145 may include multiple V2X radios 143, including a first V2X radio (e.g., a non-mmWave radio) used for transmitting and receiving non-mmWave messages and a second V2X radio (e.g., a mmWave radio) used for transmitting and receiving mmWave messages.

In some embodiments, the GPS unit 170 is a conventional GPS unit of the first endpoint 101. For example, the GPS unit 170 may include hardware that wirelessly communicates with a GPS satellite to retrieve data that describes a geographic location of the first endpoint 101. For example, the GPS unit 170 retrieves GPS data describing the geographic location of the first endpoint 101 from one or more GPS satellites. In some embodiments, the GPS unit 170 is a DSRC-compliant GPS unit of the first endpoint 101 that is operable to provide GPS data describing the geographic location of the first endpoint 101 with lane-level accuracy.

The sensor set 182 includes one or more sensors that are operable to measure a roadway environment outside of the first endpoint 101. For example, the sensor set 182 may include one or more sensors that record one or more physical characteristics of the roadway environment that is proximate to the first endpoint 101. The memory 127 may store sensor data that describes the one or more physical characteristics recorded by the sensor set 182. The roadway environment outside of the first endpoint 101 may include the second endpoint 103 and the third endpoint 104, and so, one or more of the sensors of the sensor set 182 may record sensor data that describes information about the second endpoint 103 and the third endpoint 104.

In some embodiments, the sensor set 182 may include one or more of the following vehicle sensors: a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The onboard unit 185 may be a computing device onboard on the first endpoint 101. For example, the onboard unit 185 includes an ECU. The ECU is an embedded system in automotive electronics that controls one or more of electrical systems or subsystems in the first endpoint 101. Types of the ECU include, but are not limited to, the following: Engine Control Module (ECM); Powertrain Control Module (PCM); Transmission Control Module (TCM); Brake Control Module (BCM or EBCM); Central Control Module (CCM); Central Timing Module (CTM); General Electronic Module (GEM); Body Control Module (BCM); and Suspension Control Module (SCM), etc.

In some embodiments, the first endpoint 101 may include multiple onboard units 185 (e.g., multiple ECUs). In some embodiments, the modification system 199 may be an element of the onboard unit 185.

In some embodiments, the ADAS system 183 is a conventional ADAS system that controls operation of the first endpoint 101. In some embodiments, the ADAS system 183 may also include any software or hardware included in the first endpoint 101 that makes the first endpoint 101 an autonomous vehicle or a semi-autonomous vehicle.

Examples of the ADAS system 183 may include one or more of the following elements of the first endpoint 101: an adaptive cruise control ("ACC") system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system.

In some embodiments, the autonomous driving system 184 may include any software or hardware included in the first endpoint 101 that makes the first endpoint 101 an autonomous vehicle. In some embodiments, the first endpoint 101 includes either the autonomous driving system 184 or the ADAS system 183. In some other embodiments, the first endpoint 101 includes both the autonomous driving system 184 and the ADAS system 183.

In some embodiments, the modification system 199 includes software that is operable, when executed by the processor 125, to cause the processor 125 to execute one or more steps of example processes 193, 500 and 550 and methods 300, 400 and 450 described below with reference to FIGS. 1D and 3-5B.

In some embodiments, the modification system 199 includes software that is operable, when executed by the processor 125, to cause the processor 125 to execute one or more steps of example method 800 described below with reference to FIG. 8 and/or the example general method described above.

In some embodiments, the modification system 199 may be implemented using hardware including a field-programmable gate array ("FPGA") or an application-specific integrated circuit ("ASIC"). In some other embodiments, the modification system 199 may be implemented using a combination of hardware and software. The modification system 199 may be stored in a combination of the devices (e.g., servers or other devices), or in one of the devices.

The modification system 199 is described in more detail below with reference to FIGS. 1C-8

The server 106 can be a computing device that includes a processor and a memory. For example, the server 106 is a cloud server. The server 106 may include the feedback system 109 and a beam alignment database 110. In some embodiments, the server 106 includes a communication unit such as the communication unit 145 depicted as an element of the first endpoint 101.

In some embodiments, the server 106 is an example of a connected computing device that includes the feedback system 109 and the beam alignment database 110. Accordingly, all references herein to "a server," "the server," or "the server 106" with reference to the functionality provided by the feedback system 109 and the beam alignment database 110 may be replaced by "a connected computing device," "the connected computing device," or similar terminology. A connected computing device is a processor-based computing device that includes the feedback system 109, the beam alignment database 110, and a communication unit.

The communication unit provides functionality similar to the communication unit 145, and so, that description will not be repeated here.

In some embodiments, the server 106 may store various beam report messages 107 received from various endpoints. Each beam report message 107 received from a particular endpoint may include one or more of the following: the location data 129 of the particular endpoint; the speed data 131 of the particular endpoint; the time data 133 of the particular endpoint; the weather data 135 of the particular endpoint; the relative data 138 of the particular endpoint; the endpoint data 137 of the particular endpoint; and the beam data 139 of the particular endpoint.

In some embodiments, the feedback system 109 includes software that is operable, when executed by a processor of the server 106, to cause the processor to execute one or more steps of example processes 191, 193, 500 and 550 described below with reference to FIGS. 1C-1D and 5A-5B.

In some embodiments, the feedback system 109 may be implemented using hardware including a FPGA or an ASIC. In some other embodiments, the feedback system 109 may be implemented using a combination of hardware and software. The feedback system 109 may be stored in a combination of the devices (e.g., servers or other devices), or in one of the devices.

In some embodiments, the feedback system 109 aggregates the beam report messages received from various endpoints and builds the beam alignment database 110 based on the beam report messages. The beam alignment database 110 may include a database of optimal beam alignment settings in different real-world scenarios. For example, the beam alignment database 110 is a data structure that organizes digital data describing which beam pair settings work best in different scenarios.

In some embodiments, the feedback system 109 may receive a beam request message 108 from an endpoint (e.g., the first endpoint 101). The beam request message 108 includes the scenario data 140. The feedback system 109 may apply the beam alignment database 110 to determine a recommended beam alignment setting for the endpoint based on the scenario data 140. The feedback system 109 generates the feedback data 144 describing the recommended beam alignment setting and sends the feedback data 144 to the endpoint so that the endpoint can perform a mmWave communication using the recommended beam alignment setting.

The feedback system 109 is described in more detail below with reference to FIGS. 1C-1D and 5A-5B.

Referring to FIG. 1B, depicted is another operating environment 150 for the modification system 199 and the feedback system 109 according to some embodiments. The operating environment 150 may include one or more of the following elements: the server 106; an ego vehicle 123; and one or more remote vehicles 124. These elements of the operating environment 150 may be communicatively coupled to the network 105.

Although one ego vehicle 123, three remote vehicles 124, one server 106 and one network 105 are depicted in FIG. 1B, in practice the operating environment 150 may include one or more ego vehicles 123, one or more remote vehicles 124, one or more servers 106 and one or more networks 105.

In some embodiments, the ego vehicle 123 may be an example of the first endpoint 101 and a remote vehicle 124 may be an example of the second endpoint 103 or the third endpoint 104. Thus, description provided herein for the first endpoint 101, the second endpoint 103 and the third endpoint 104 may also be applicable to the ego vehicle 123 and the remote vehicle 124. Similar description is not repeated here.

In some embodiments, the ego vehicle 123 and the remote vehicle 124 may have a similar structure, and the description provided below for the ego vehicle 123 may also be applicable to the remote vehicle 124. For example, both the ego vehicle 123 and the remote vehicle 124 include some or all of the elements depicted in FIG. 1B as being elements of the ego vehicle 123.

In some embodiments, at least one remote vehicle 124 is a connected vehicle like the ego vehicle 123. In some embodiments, at least one remote vehicle 124 is an unconnected vehicle. The remote vehicle 124 includes elements that are similar to those of the ego vehicle 123 including, for example, the sensors and the V2X radio. In some embodiments, the remote vehicle 124 includes its own instance of the modification system 199.

In some embodiments, one or more of the ego vehicle 123 and the remote vehicle 124 may be DSRC-equipped devices. The network 105 may include one or more communication channels shared among the ego vehicle 123, the remote vehicle 124 and one or more RSUs. The one or more communication channels may include DSRC, LTE-V2X, 5G-V2X, full-duplex wireless communication or any other wireless communication protocol. For example, the network 105 may be used to transmit a DSRC message, DSRC probe or BSM including any of the data described herein.

The ego vehicle 123 may be any type of vehicle. For example, the ego vehicle 123 may include one of the following types of vehicles: a car; a truck; a sports utility vehicle; a bus; a semi-truck; a drone or any other roadway-based conveyance.

In some embodiments, the ego vehicle 123 may include an autonomous vehicle or a semi-autonomous vehicle. For example, the ego vehicle 123 may include an Advanced Driver-Assistance System (e.g., the ADAS system 183). The ADAS system 183 may provide some or all of the functionality that provides autonomous functionality.

The ego vehicle 123 may include one or more of the following elements: the processor 125; the memory 127; the communication unit 145; the GPS unit 170; the sensor set 182; an ECU 186; the ADAS system 183; the autonomous driving system 184; and the modification system 199. These elements of the ego vehicle 123 may be communicatively coupled to one another via a bus. These elements of the ego vehicle 123 are described above with reference to FIG. 1A, and similar description is not repeated here.

In some embodiments, the memory 127 of the ego vehicle 123 stores one or more of: the location data 129; the speed data 131; the time data 133; the weather data 135; vehicle data 136; the relative data 138; the beam data 139; the scenario data 140; and the feedback data 144.

The location data 129 includes, for example, digital data that describes a geographic location of the ego vehicle 123 as determined by one or more onboard sensors of the ego vehicle 123. For example, the location data 129 includes GPS data describing the geographic location of the ego vehicle 123 with a lane-level accuracy, e.g., an accuracy of plus or minus 3 meters as required by the DSRC standard.

The speed data 131 includes, for example, digital data describing a value for a speed of the ego vehicle 123 (e.g., how fast the ego vehicle 123 is driving, i.e., "a speed" of the ego vehicle 123), a value for how fast the ego vehicle is accelerating (e.g., how quickly the ego vehicle 123 is accelerating, i.e., "an acceleration" of the ego vehicle 123), or a combination thereof for the ego vehicle 123.

The time data 133 includes digital data describing a time when the ego vehicle 123 is present at the geographic location described by the location data 129. For example, the time data 133 describes a time of day and a day of week when the ego vehicle 123 is present at the geographic location described by the location data 129.

The vehicle data 136 includes digital data that describes one or more of a make and model of the ego vehicle 123, as well as a make and model of the remote vehicle 124 if applicable.

The relative data 138 includes digital data describing a parameter of the remote vehicle 124 relative to the ego vehicle 123. For example, the relative data 138 includes digital data describing one or more of a location of the remote vehicle 124 relative to the ego vehicle 123, a speed of the remote vehicle 124 relative to the ego vehicle 123 and an acceleration of the remote vehicle 124 relative to the ego vehicle 123.

The beam data 139 includes digital data describing one or more results of a beam alignment training performed by the ego vehicle 123 with the remote vehicle 124. For example, the beam data 139 includes one or more of: a list of candidate beam pairs being trained between the ego vehicle 123 and the remote vehicle 124; a received signal strength for each candidate beam pair being trained; and a data rate achieved by each candidate beam pair.

The scenario data 140 includes digital data describing, for example, a driving scenario of one or more of the ego vehicle 123 and the remote vehicle 124. In some embodiments, the scenario data 140 includes one or more of: the location data 129; the speed data 131; the time data 133; the weather data 135; the relative data 138; and the vehicle data 136.

The feedback data 144 includes digital data describing a recommended beam alignment setting that is determined by the server 106 for one or more of the ego vehicle 123 and the remote vehicle 124 based on the scenario data 140.

In some embodiments, the memory 127 stores one or more of the following as recorded or determined by the onboard systems (e.g., sensor set 182, modification system 199) of one or more remote vehicles 124: location data 129; speed data 131; time data 133; weather data 135; vehicle data 136; beam data 139; scenario data 140; feedback data 144; and relative data 138.

Figure 1C:
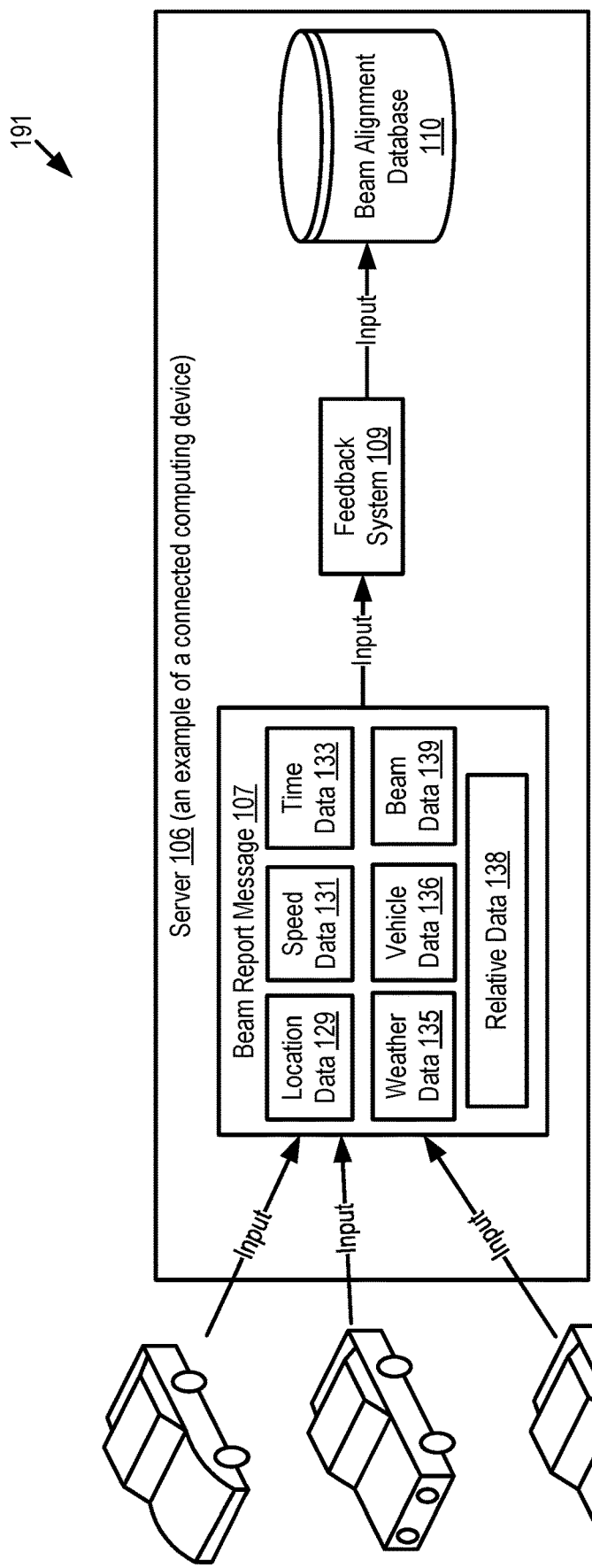
FIG. 1C depicts an example process executed by a modification system and a feedback system for building a beam alignment database according to some embodiments.

Referring to FIG. 1C, an example process 191 executed by the modification system 199 and the feedback system 109 for building the beam alignment database 110 is depicted according to some embodiments. In FIG. 1C, various connected vehicles are depicted to communicate with the server 106 via a V2X network to construct the beam alignment database 110 on the server 106. In some embodiments, the various connected vehicles are ego vehicles 123. Alternatively, the various connected vehicles include the ego vehicle 123, the remote vehicle 124 and any other vehicles.

In some embodiments, each of the various vehicles has a mmWave V2X radio and another radio with access to the server 106 (e.g., C-V2X, LTE-V2X, 5G-V2X, etc.) which is used to upload and download data to and from the server 106.

In some embodiments, the feedback system 109 of the server 106 collects data from the various connected vehicles enabled with mmWave communication capabilities about which beam pair settings have been successful for them in different scenarios; and the modification system 199 of each of the various connected vehicles provides this information to the feedback system 109. Then, the feedback system 109 builds the beam alignment database 110 which includes, for example, a database describing which beam pair settings work best in different scenarios.

For example, assume that the various connected vehicles in FIG. 1C are ego vehicles 123. Each of the ego vehicles 123 includes an instance of the modification system 199 installed in the vehicle. The modification system 199 of an ego vehicle 123 and the feedback system 109 of the server 106 cooperate with one another to execute one or more of the following operations at different times in order to construct the beam alignment database 110:

Operation (1): The modification system 199 of the ego vehicle 123 determines that one or more of the onboard components of the ego vehicle 123 desire to exchange a mmWave communication with a remote vehicle 124. For example, the ADAS system 183 or the autonomous driving system 184 of the ego vehicle 123 provides a command to the onboard communication unit 145 of the ego vehicle 123 to transmit a mmWave message to the remote vehicle 124.

Operation (2): The modification system 199 causes the onboard sensors of the ego vehicle 123 to record digital data describing a driving scenario. This digital data can be referred to as scenario data and includes one or more of the following: (a) location data 129 that describes a geographic location of the ego vehicle 123 (perhaps with lane-level accuracy, i.e., an accuracy of plus or minus 3 meters as required by the DSRC standard); (b) speed data 131 describing a speed, an acceleration or a combination thereof of the ego vehicle 123; (c) time data 133 describing a time when the ego vehicle 123 is present at the geographic location described by the location data; (d) weather data 135 describing one or more weather conditions at the geographic location; (e) relative data 138 describing information of the remote vehicle 124 relative to the ego vehicle 123 such as a location of the remote vehicle 124 relative to the ego vehicle 123, a speed of the remote vehicle 124 relative to the ego vehicle 123, an acceleration of the remote vehicle 124 relative to the ego vehicle 123; and (f) vehicle data 136 describing information about the ego vehicle 123 and the remote vehicle 124 such as a make and model of the ego vehicle 123 and the remote vehicle 124 (if known).

Operation (3): The modification system 199 causes the V2X radio 143 of the ego vehicle 123 to record beam data 139 describing one or more results of a beam alignment training with the remote vehicle 124. The beam data 139 is digital data describing, for example, a list of candidate mmWave beam pairs trained, a received signal strength (RSS) for each of the candidate mmWave beam pairs trained and a data rate achieved for each of the candidate mmWave beam pairs trained.

Operation (4): The modification system 199 causes the communication unit 145 of the ego vehicle 123 to transmit a beam report message 107 to the feedback system 109 via a wireless network (e.g., 3G, 4G, 5G, LTE, etc.). For example, the beam report message is an electronic wireless message that includes one or more of the following types of digital data as its payload: the beam data 139; the location data 129; the speed data 131; the time data 133; the weather data 135; the relative data 138; and the vehicle data 136.

Operation (5): The feedback system 109 receives various beam report messages 107 from various ego vehicles 123 and uses these beam report messages as inputs to construct the beam alignment database 110. The beam alignment database 110 is, for example, a data structure that organizes digital data describing which beam pair settings work best in different scenarios.

Figure 1D:
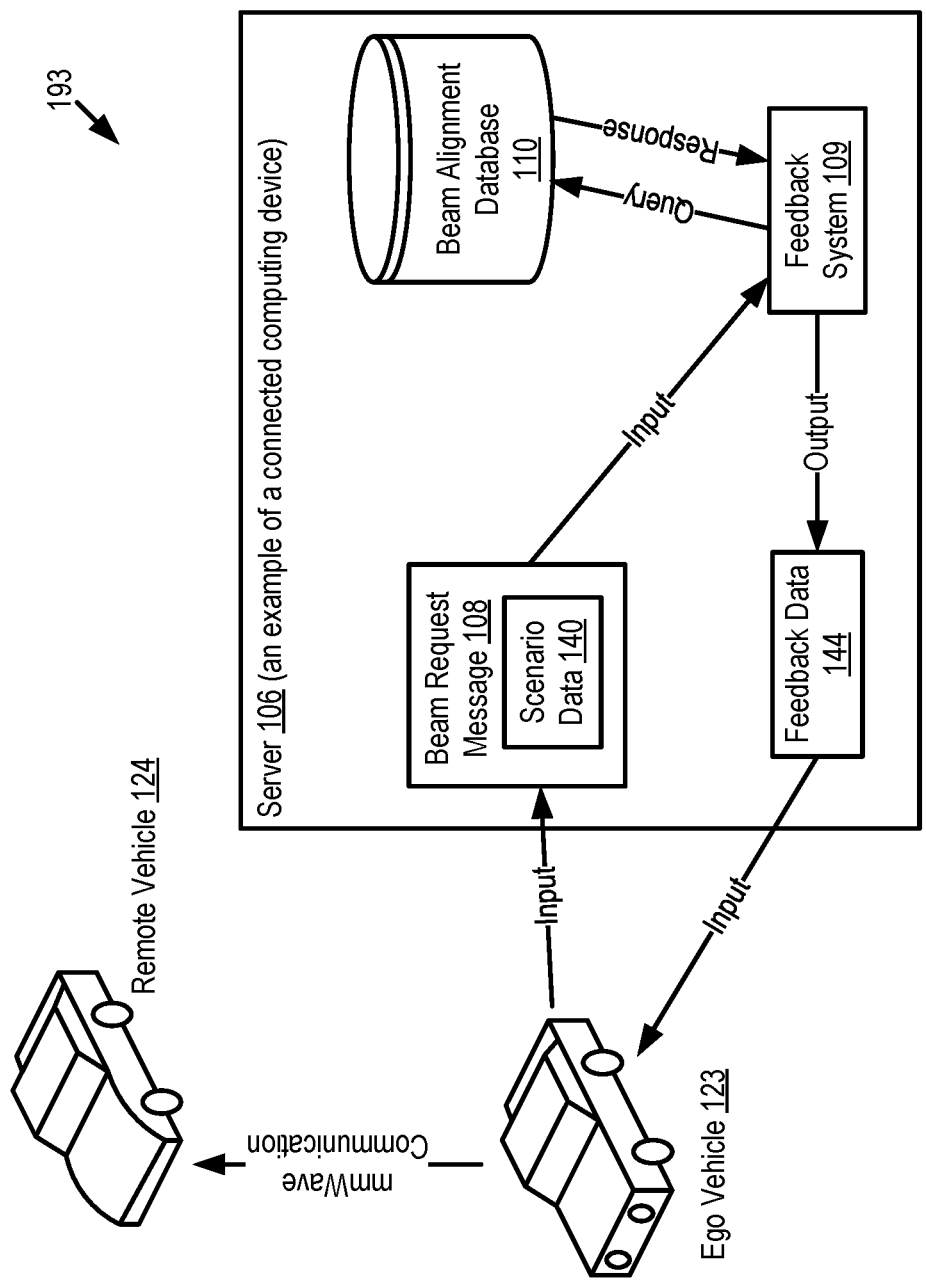
FIG. 1D depicts an example process executed by a modification system and a feedback system for mmWave communications according to some embodiments.

FIG. 1D depicts an example process 193 executed by the modification system 199 and the feedback system 109 for mmWave communications according to some embodiments. The process 193 shows an example approach to use the beam alignment database 110 in a feedback loop. In some embodiments, after the beam alignment database 110 is built (e.g., a sufficient quantity of past mmWave communication scenarios and corresponding candidate beam pairs have been collected and organized in the database 110), the modification system 199 can use the data stored in the beam alignment database 110 as feedback which is used to quickly train the V2X radio 143 for mmWave communications using the beam alignment settings stored in the beam alignment database 110. For example, the ego vehicle 123 is intended to perform a mmWave communication with the remote vehicle 124, and the feedback system 109 can provide feedback data to facilitate the mmWave communication between the ego vehicle 123 and the remote vehicle 124.

For example, after the beam alignment database 110 is built, the modification system 199 of the ego vehicle 123 and the feedback system 109 of the server 106 cooperate with one another to execute one or more of the following operations:

Operation (1): The modification system 199 of the ego vehicle 123 determines that a mmWave message is desired to be exchanged by the ego vehicle 123 with the remote vehicle 124.

Operation (2): The modification system 199 of the ego vehicle 123 determines scenario data 140 describing a current driving scenario of the ego vehicle 123 with the remote vehicle 124.

Operation (3): The modification system 199 of the ego vehicle 123 requests a recommended beam alignment setting from the feedback system 109 based on the current driving scenario. This request is communicated as a beam request message 108. The beam request message 108 is an electronic wireless message that includes, for example, the scenario data as its payload and includes a request for a recommended beam alignment setting that is optimized based on the current driving scenario described by the scenario data 140.

Additionally, or alternatively, the modification system 199 of the remote vehicle 124 can also determine the scenario data 140 describing the current driving scenario with the ego vehicle 123 and sends the scenario data 140 to the server 106 via the beam request message 108.

Operation (4): The feedback system 109 of the server 106 receives the beam request message 108 as an input and determines, based on the scenario data 140 and the beam alignment database 110, an instance of feedback data 144. The feedback data 144 is digital data that describes, for example, an optimal beam alignment setting for one or more of the ego vehicle 123 and the remote vehicle 124 based on the current driving scenario and the beam alignment settings that have worked best for other vehicles in similar scenarios as described by the data included in the beam alignment database 110. For example, the feedback system 109 queries the beam alignment database 110 using the scenario data 140 and receives a response from the beam alignment database, where the response includes the recommended beam alignment setting retrieved based on the scenario data 140. The feedback system 109 transmits an electronic wireless message to the ego vehicle 123 that includes the feedback data 144 as its payload.

Operation (5): The modification system 199 of the ego vehicle 123 receives the wireless message that include the feedback data 144 describing the recommended beam alignment setting based on the current driving scenario.

Operation (6): The modification system 199 takes steps to modify the mmWave radio settings of the ego vehicle 123

(and, optionally, the remote vehicle 124 as well) based on the feedback data 144 provided by the feedback system 109 describing the recommended beam alignment setting.

Operation (7): The modification system 199 causes the V2X radio 143 of the ego vehicle 123 to exchange the mmWave message with the remote vehicle 124 using the recommended beam alignment setting.

Example benefits provided by the modification system 199 and the feedback system 109 described herein include, but are not limited to, the following: (1) learning (e.g., machine learning, deep learning, etc.) on performance of past beam pairs can be implemented, which can be used for beam alignment recommendations in different scenarios of mmWave communications; and (2) beam alignment overhead for mmWave communications is reduced. Here, the beam alignment overhead may refer to one or more of an amount of resources and an amount of time needed to perform a beam alignment. For example, by utilizing the recommended beam alignment setting received from the server 106, the modification system 199 may perform a beam alignment training with a faster speed or even the beam alignment training is no longer needed.

Figure 2:
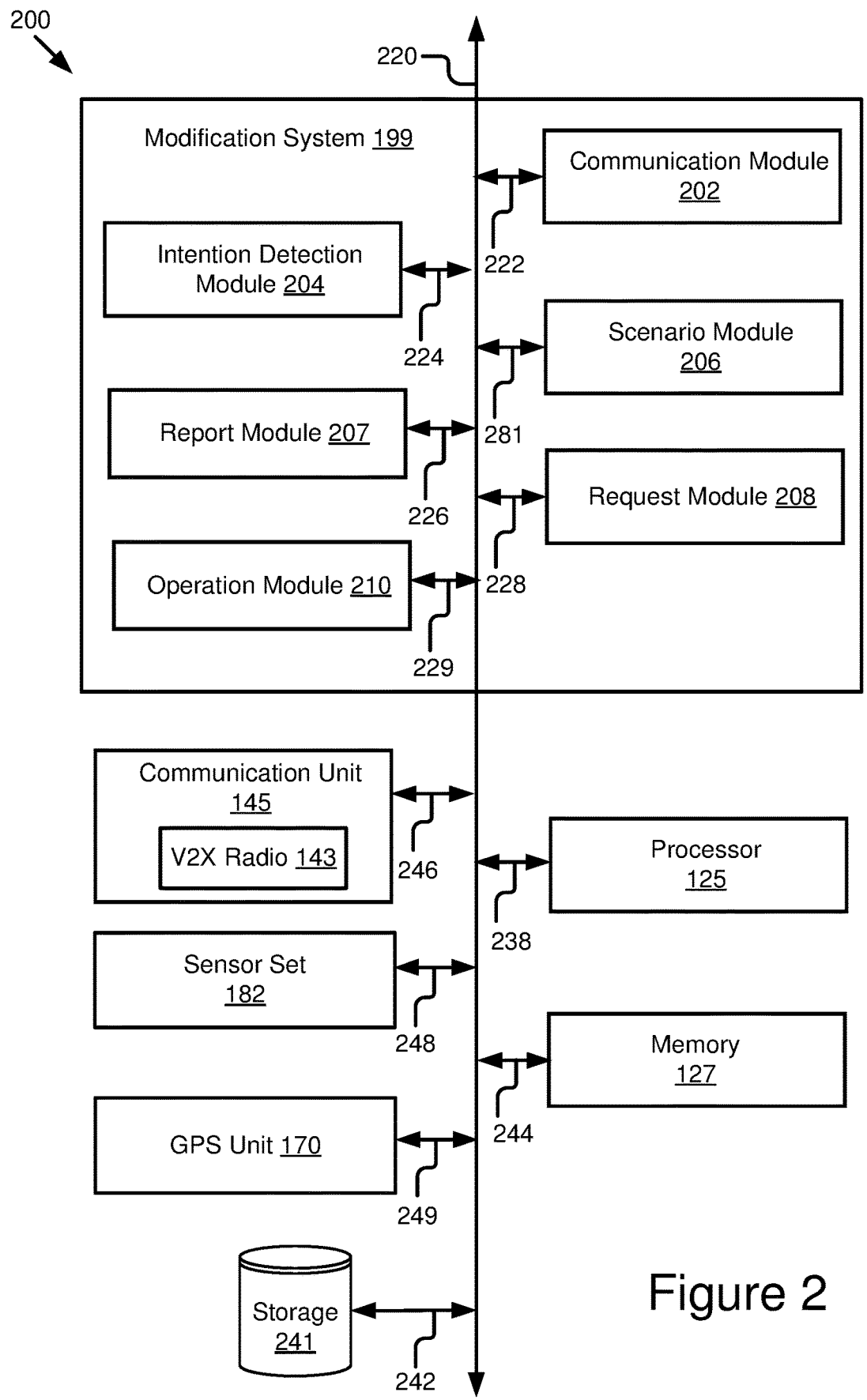
FIG. 2 is a block diagram illustrating an example computer system including a modification system according to some embodiments.

Referring now to FIG. 2, depicted is a block diagram illustrating an example computer system 200 including the modification system 199 according to some embodiments. In some embodiments, the computer system 200 may include a special-purpose computer system that is programmed to perform one or more steps of methods 300, 400 and 450 described below with reference to FIGS. 3-4B and processes 500 and 550 described below with reference to FIGS. 5A-5B.

In some embodiments, the computer system 200 may be an element of the first endpoint 101. In some embodiments, the computer system 200 may be an onboard vehicle computer of the first endpoint 101. In some embodiments, the computer system 200 may include an engine control unit, head unit or some other processor-based computing device of the first endpoint 101.

The computer system 200 may include one or more of the following elements according to some examples: the modification system 199; the processor 125; the communication unit 145; the sensor set 182; the GPS unit 170; the memory 127; and a storage 241. The components of the computer system 200 are communicatively coupled by a bus 220.

In the illustrated embodiment, the processor 125 is communicatively coupled to the bus 220 via a signal line 238. The communication unit 145 is communicatively coupled to the bus 220 via a signal line 246. The sensor set 182 is communicatively coupled to the bus 220 via a signal line 248. The GPS unit 170 is communicatively coupled to the bus 220 via a signal line 249. The storage 241 is communicatively coupled to the bus 220 via a signal line 242. The memory 127 is communicatively coupled to the bus 220 via a signal line 244.

The following elements of the computer system 200 are described above with reference to FIGS. 1A-1B, and so, those descriptions will not be repeated here: the processor 125; the communication unit 145; the sensor set 182; the GPS unit 170; and the memory 127.

The storage 241 can be a non-transitory storage medium that stores data for providing the functionality described herein. The storage 241 may be a dynamic random-access memory (DRAM) device, a static random-access memory (SRAM) device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment shown in FIG. 2, the modification system 199 includes: a communication module 202; an intention detection module 204; a scenario module 206; a report module 207; a request module 208; and an operation module 210. These components of the modification system 199 are communicatively coupled to each other via the bus 220. In some embodiments, components of the modification system 199 can be stored in a single server or device. In some other embodiments, components of the modification system 199 can be distributed and stored across multiple servers or devices. For example, some of the components of the modification system 199 may be distributed across the third endpoint 104, the second endpoint 103 and the first endpoint 101.

The communication module 202 can be software including routines for handling communications between the modification system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via a signal line 222.

The communication module 202 sends and receives data, via the communication unit 145, to and from one or more elements of the operating environment 100 or 150. For example, the communication module 202 receives or transmits, via the communication unit 145, a wireless message. The communication module 202 may send or receive any of the data or messages described above with reference to FIGS. 1A-1D via the communication unit 145.

In some embodiments, the communication module 202 receives data from components of the modification system 199 and stores the data in one or more of the storage 241 and the memory 127. For example, the communication module 202 receives any of the data described above with reference to the memory 127 from the communication unit 145 (via the network 105, a DSRC message, a BSM, a DSRC probe, a full-duplex wireless message, etc.) and stores this data in the memory 127 (or temporarily in the storage 241 which may act as a buffer for the computer system 200).

In some embodiments, the communication module 202 may handle communications between components of the modification system 199. For example, the communication module 202 may handle communications among the intention detection module 204, the scenario module 206, the report module 207, the request module 208 and the operation module 210. Any of these modules may cause the communication module 202 to communicate with the other elements of the computer system 200 or the operating environments 100, 150 (via the communication unit 145), 600. For example, the scenario module 206 may use the communication module 202 to communicate with the sensor set 182 and cause the sensor set 182 to record sensor data.

The intention detection module 204 can be software including routines for detecting an intention of the first endpoint 101 to exchange a mmWave message with another endpoint (e.g., the second endpoint 103 or the third endpoint 104). In some embodiments, the intention detection module 204 can be stored in the memory 127 of the computer system 200 and can be accessible and executable by the processor 125. The intention detection module 204 may be adapted for cooperation and communication with the processor 125 and other components of the computer system 200 via a signal line 224.

In some embodiments, the ADAS system 183 or the autonomous driving system 184 of the first endpoint 101 provides a command to the communication unit 145 of the first endpoint 101 to transmit a mmWave message to another endpoint (e.g., the second endpoint 103 or the third endpoint 104). Responsive to receiving the command, the intention detection module 204 determines that a mmWave message is desired to be exchanged by the first endpoint 101 with the other endpoint. The intention detection module 204 may notify the scenario module 206 of the first endpoint's intention to exchange the mmWave message, which causes the scenario module 206 to generate scenario data as described below.

The scenario module 206 can be software including routines that, when executed by the processor 125, cause the processor 125 to generate scenario data. In some embodiments, the scenario module 206 can be a set of instructions stored in the memory 127 of the computer system 200 and can be accessible and executable by the processor 125. The scenario module 206 may be adapted for cooperation and communication with the processor 125 and other components of the computer system 200 via a signal line 281.

In some embodiments, the scenario module 206 may operate one or more sensors of the sensor set 182 to generate sensor data describing the measurements of the sensor set 182. The scenario module 206 may cause the sensor data to be stored in the memory 127. Specifically, the scenario module 206 may operate one or more sensors included in the sensor set 182 to record sensor data describing measurements of a physical environment proximate to the computer system 200. The second endpoint 103, the third endpoint 104 or a combination thereof may be located in the physical environment proximate to the first endpoint 101 that includes the computer system 200.

In some embodiments, responsive to the intention detection module 204 detecting the first endpoint's intention to exchange a mmWave message with another endpoint, the scenario module 206 generates scenario data describing a scenario of one or more of the first endpoint 101 and the other endpoint based on the sensor data recorded by the sensor set 182. For example, the first endpoint 101 is the ego vehicle 123 while the other endpoint is a roadside unit, and the scenario can be a driving scenario of the ego vehicle 123 near the roadside unit. In another example, the first endpoint 101 and the other endpoint are the ego vehicle 123 and the remote vehicle 124 respectively, and the scenario can be a driving scenario involving both the ego vehicle 123 and the remote vehicle 124.

In some embodiments, the scenario data includes one or more of: location data describing a geographic location of the first endpoint 101; speed data describing a speed, an acceleration or a combination thereof of the first endpoint 101; time data describing a time when the first endpoint 101 is present at the geographic location; weather data describing one or more weather conditions at the geographic location; relative data describing one or more of a location of the other endpoint relative to the first endpoint 101, a speed of the other endpoint relative to the first endpoint 101 and an acceleration of the other endpoint relative to the first endpoint 101; and endpoint data describing one or more of a make and model of the other endpoint and a make and model of the first endpoint 101.

For example, the scenario module 206 generates location data describing a geographic location of the first endpoint 101 and time data describing a time when the first endpoint is present at the geographic location based on sensor data recorded by the GPS unit 170. The scenario module 206 generates speed data describing a speed, an acceleration, or a combination thereof of the first endpoint 101 based on sensor data recorded by an accelerometer. The scenario module 206 generates weather data describing one or more weather conditions at the geographic location based on sensor data recorded by a camera, a LIDAR sensor, a thermostat, and any other types of sensors. Furthermore, based on the sensor data recorded by the sensor set 182, the scenario module 206 may also generate: relative data describing one or more of a location of the other endpoint relative to the first endpoint 101, a speed of the other endpoint relative to the first endpoint 101 and an acceleration of the other endpoint relative to the first endpoint 101; and endpoint data describing one or more of a make and model of the other endpoint and a make and model of the first endpoint 101.

The report module 207 can be software including routines that, when executed by the processor 125, cause the processor 125 to generate a beam report message. In some embodiments, the report module 207 can be stored in the memory 127 of the computer system 200 and can be accessible and executable by the processor 125. The report module 207 may be adapted for cooperation and communication with the processor 125 and other components of the computer system 200 via a signal line 226.

In some embodiments, the report module 207 receives the scenario data describing the scenario of one or more of the first endpoint 101 and the other endpoint from the scenario module 206. The report module 207 monitors a beam alignment training for exchanging of the mmWave message between the first endpoint 101 and the other endpoint and causes the V2X radio 143 of the first endpoint 101 to record beam data describing one or more results of the beam alignment training with the other endpoint. In some embodiments, the beam data includes one or more of: a list of candidate beam pairs being trained; a received signal strength for each candidate beam pair being trained; and a data rate achieved by each candidate beam pair.

The report module 207 causes the V2X radio 143 of the first endpoint 101 to transmit the beam report message including the scenario data and the beam data to the server via a V2X network. In this case, the feedback system 109 of the server 106 can use the beam report message as an input to build the beam alignment database 110 that includes optimal beam alignment settings in different real-world scenarios as described above with reference to FIG. 1C or below with reference to FIG. 5A.

The request module 208 can be software including routines that, when executed by the processor 125, cause the processor 125 to request a recommended beam alignment setting from the server 106 based on the scenario data. In some embodiments, the request module 208 can be stored in the memory 127 of the computer system 200 and can be accessible and executable by the processor 125. The request module 208 may be adapted for cooperation and communication with the processor 125 and other components of the computer system 200 via a signal line 228.

In some embodiments, responsive to (1) the intention detection module 204 detecting the first endpoint's intention to exchange a mmWave message with another endpoint and (2) the beam alignment database 110 being already built in the server 106, the request module 208 receives scenario data from the scenario module 206 and requests a recommended beam alignment setting from the server 106 based on the scenario data. For example, the request module 208 generates and sends a beam request message to the server 106. The beam request message includes the scenario data as payload data and includes a request for the recommended beam alignment setting that is optimized for the scenario. The beam request message causes the feedback system 109 of the server 106 to query the beam alignment database 110 (which includes optimal beam alignment settings in different real-world scenarios) based on the scenario data and to generate feedback data describing the recommended beam alignment setting as a query result. The feedback system 109 of the server 106 sends the feedback data to the operation module 210.

The operation module 210 can be software including routines that, when executed by the processor 125, cause the processor 125 to modify an operation of the V2X radio 143 based on the feedback data for execution of a mmWave communication. In some embodiments, the operation module 210 can be stored in the memory 127 of the computer system 200 and can be accessible and executable by the processor 125. The operation module 210 may be adapted for cooperation and communication with the processor 125 and other components of the computer system 200 via a signal line 229.

In some embodiments, the operation module 210 receives the feedback data describing the recommended beam alignment setting from the server 106. The operation module 210 modifies an operation of the V2X radio 143 of the first endpoint 101 based on the recommended beam alignment setting to cause a beam of the V2X radio 143 of the first endpoint 101 to be aligned with a beam of the V2X radio 143 of the other endpoint. As a result, the V2X radio 143 of the first endpoint 101 exchanges the mmWave message with the V2X radio 143 of the other endpoint using the recommended beam alignment setting.

In some embodiments, the operation module 210 modifies both (1) an operation of the V2X radio 143 of the first endpoint 101 and (2) an operation of the V2X radio 143 of the other endpoint based on the recommended beam alignment setting to cause the beam of the V2X radio 143 of the first endpoint 101 to be aligned with the beam of the V2X radio 143 of the other endpoint. As a result, the mmWave message is exchanged between the first endpoint 101 and the other endpoint using the recommended beam alignment setting.

For example, the recommended beam alignment setting includes a first recommended beam lobe for the first endpoint and a second recommended beam lobe for the other endpoint, and the V2X radio 143 of the first endpoint 101 and the V2X radio 143 of the other endpoint are modified to use the first recommended beam lobe and the second recommended beam lobe respectively to exchange the mmWave message (e.g., the operation module 210 modifies an operation of the V2X radio 143 of the first endpoint 101 so that the V2X radio 143 of the first endpoint 101 uses the first recommended beam lobe for the exchanging of the mmWave message, and the operation module 210 modifies an operation of the V2X radio 143 of the other endpoint so that the V2X radio 143 of the other endpoint uses the second recommended beam lobe for the exchanging of the mmWave message).

In some embodiments, the recommended beam alignment setting provides an improved mmWave communication performance for one or more of the V2X radio 143 of the first endpoint 101 and the V2X radio 143 of the other endpoint, where the improved mmWave communication perform includes a reduction of beam alignment overhead (e.g., a reduced beam alignment training time, a reduced amount of computing resources needed to perform the beam alignment training, etc.).

In some embodiments, the operation module 210 generates mmWave performance data related to the exchanging of the mmWave message that is performed using the recommended beam alignment setting. For example, the mmWave performance data includes one or more of an achieved data rate, a received signal strength, etc. The operation module 210 uploads the mmWave performance data to the server 106.

In some embodiments, the operation module 210 may monitor the mmWave performance of the exchanging of the mmWave message. If the mmWave performance drops below a threshold (e.g., an achieved data rate is below a data rate threshold), the operation module 210 may instruct: (1) the scenario module 206 to update the scenario data; and (2) the request module 208 to request for a new recommended beam alignment setting based on the updated scenario data. In this case, the operation module 210 may modify one or more of (1) an operation of the V2X radio 143 of the first endpoint 101 and (2) an operation of the V2X radio 143 of the other endpoint again based on the new recommended beam alignment setting.

In some embodiments, if the application of the recommended beam alignment setting fails (e.g., the mmWave performance drops below a threshold when using the recommended beam alignment setting), the operation module 210 may use new beam pairs to train one or more of the V2X radio 143 of the first endpoint 101 and the V2X radio 143 of the other endpoint. The operation module 210 may cause the report module 207 to report the related beam data and scenario data to the server 106.

Example Processes

Referring now to FIG. 3, depicted is a flowchart of an example method 300 for modifying the V2X radio 143 of the first endpoint 101 based on beam alignment feedback data according to some embodiments. The steps of the method 300 are executable in any order, and not necessarily the order depicted in FIG. 3. The method 300 may be executed by the first endpoint 101.

At step 301, the intention detection module 204 detects an intention of the first endpoint 101 to exchange a mmWave message with another endpoint. By way of examples, here assume that the other endpoint is the second endpoint 103. Of course, the other endpoint can be the third endpoint 104 or any other endpoint.

At step 303, the scenario module 206 determines scenario data describing a scenario of one or more of the first endpoint 101 and the second endpoint 103.

At step 305, the request module 208 requests a recommended beam alignment setting from the server 106 based on the scenario data.

At step 307, the operation module 210 receives feedback data describing the recommended beam alignment setting from the server 106.

At step 309, the operation module 210 modifies an operation of the V2X radio 143 of the first endpoint 101 based on the recommended beam alignment setting so that the V2X radio 143 of the first endpoint 101 exchanges the mmWave message with the second endpoint 103 using the recommended beam alignment setting.

Figure 4A:
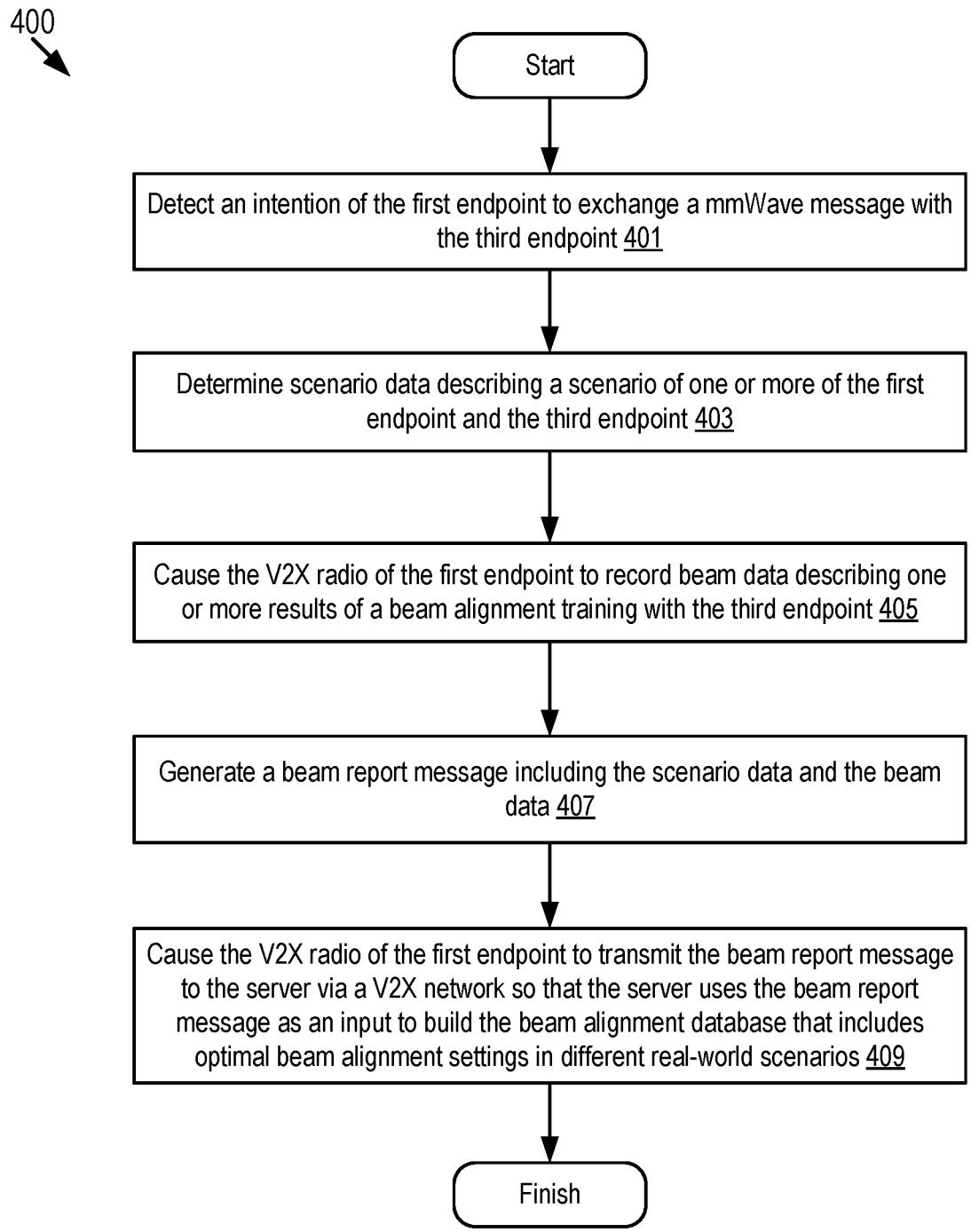
FIG. 4A depicts a method for creating a beam report message by a first endpoint according to some embodiments.

FIG. 4A depicts a method 400 for creating a beam report message according to some embodiments. The steps of the method 400 are executable in any order, and not necessarily the order depicted in FIG. 4A. The method 400 may be executed by the first endpoint 101.

At step 401, the intention detection module 204 detects an intention of the first endpoint 101 to exchange a mmWave message with another endpoint. By way of examples, here assume that the other endpoint is the third endpoint 104. Of course, the other endpoint can be the second endpoint 103 or any other endpoint.

At step 403, the scenario module 206 determines scenario data describing a scenario of one or more of the first endpoint 101 and the third endpoint 104.

At step 405, the report module 207 causes the V2X radio 143 of the first endpoint 101 to record beam data describing one or more results of a beam alignment training with the third endpoint 104.

At step 407, the report module 207 generates a beam report message including the scenario data and the beam data.

At step 409, the report module 207 causes the V2X radio 143 of the first endpoint 101 to transmit the beam report message to the server 106 via a V2X network so that the server 106 uses the beam report message as an input to build the beam alignment database 110 that includes optimal beam alignment settings in different real-world scenarios.

Figure 4B:
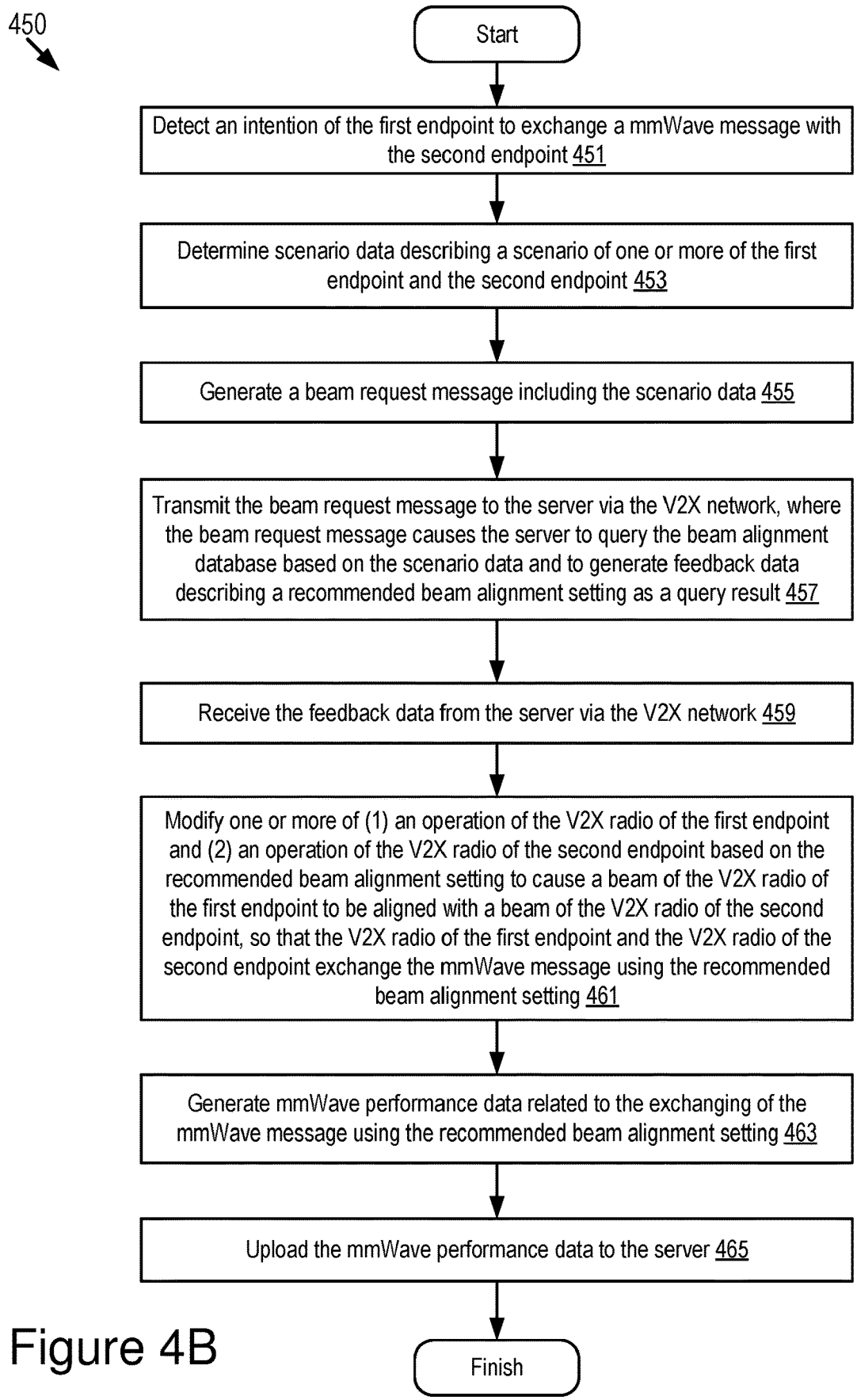
FIG. 4B depicts another method for modifying a V2X radio of a first endpoint based on beam alignment feedback data according to some embodiments.

FIG. 4B depicts another method 450 for modifying the V2X radio 143 of the first endpoint 101 based on beam alignment feedback data according to some embodiments. The steps of the method 450 are executable in any order, and not necessarily the order depicted in FIG. 4B. The method 450 may be executed by the first endpoint 101.

At step 451, the intention detection module 204 detects an intention of the first endpoint 101 to exchange a mmWave message with another endpoint. By way of examples, here assume that the other endpoint is the second endpoint 103. Of course, the other endpoint can be the third endpoint 104 or any other endpoint.

At step 453, the scenario module 206 determines scenario data describing a scenario of one or more of the first endpoint 101 and the second endpoint 103.

At step 455, the report module 207 generates a beam request message including the scenario data.

At step 457, the report module 207 transmits the beam request message to the server 106 via the V2X network, where the beam request message causes the server 106 to query the beam alignment database 110 based on the scenario data and to generate feedback data describing a recommended beam alignment setting as a query result.

At step 459, the operation module 210 receives the feedback data from the server 106 via the V2X network.

At step 461, the operation module 210 modifies one or more of (1) an operation of the V2X radio 143 of the first endpoint 101 and (2) an operation of the V2X radio 143 of the second endpoint 103 based on the recommended beam alignment setting to cause a beam of the V2X radio 143 of the first endpoint 101 to be aligned with a beam of the V2X radio 143 of the second endpoint 103, so that the V2X radio 143 of the first endpoint 101 and the V2X radio 143 of the second endpoint 103 exchange the mmWave message using the recommended beam alignment setting.

At step 463, the operation module 210 generates mmWave performance data related to the exchanging of the mmWave message that is performed using the recommended beam alignment setting.

At step 465, the operation module 210 uploads the mmWave performance data to the server 106.

Figure 5A:
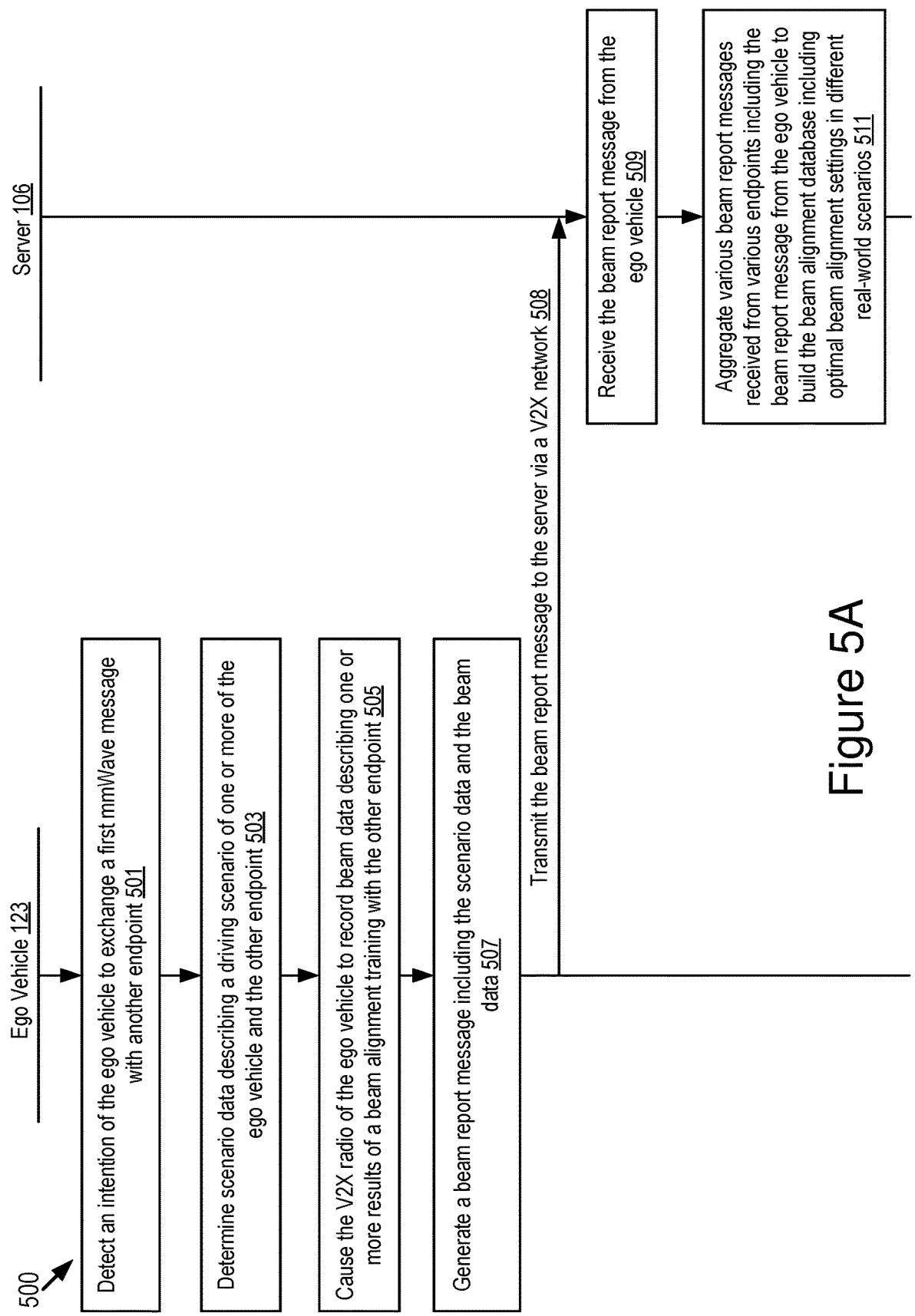
FIG. 5A depicts an example process for creating a beam alignment database according to some embodiments.

FIG. 5A depicts an example process 500 for creating the beam alignment database 110 according to some embodiments. The steps of the process 500 are executable in any order, and not necessarily the order depicted in FIG. 5A.

At step 501, the intention detection module 204 of the ego vehicle 123 detects an intention of the ego vehicle 123 to exchange a mmWave message with another endpoint. For example, the other endpoint can be the remote vehicle 124 or any other endpoint.

At step 503, the scenario module 206 of the ego vehicle 123 determines scenario data describing a driving scenario of one or more of the ego vehicle 123 and the other endpoint.

At step 505, the report module 207 of the ego vehicle 123 causes the V2X radio 143 of the ego vehicle 123 to record beam data describing one or more results of a beam alignment training with the other endpoint.

At step 507, the report module 207 of the ego vehicle 123 generates a beam report message including the scenario data and the beam data.

At step 508, the report module 207 of the ego vehicle 123 transmits the beam report message to the server 106 via a V2X network using the V2X radio 143 of the ego vehicle 123.

At step 509, the feedback system 109 of the server 106 receives the beam report message from the ego vehicle 123.

At step 511, the feedback system 109 of the server 106 aggregates various beam report messages received from various endpoints including the beam report message from the ego vehicle 123 to build the beam alignment database 110, where the beam alignment database 110 includes optimal beam alignment settings in different real-world scenarios.

Figure 5B:
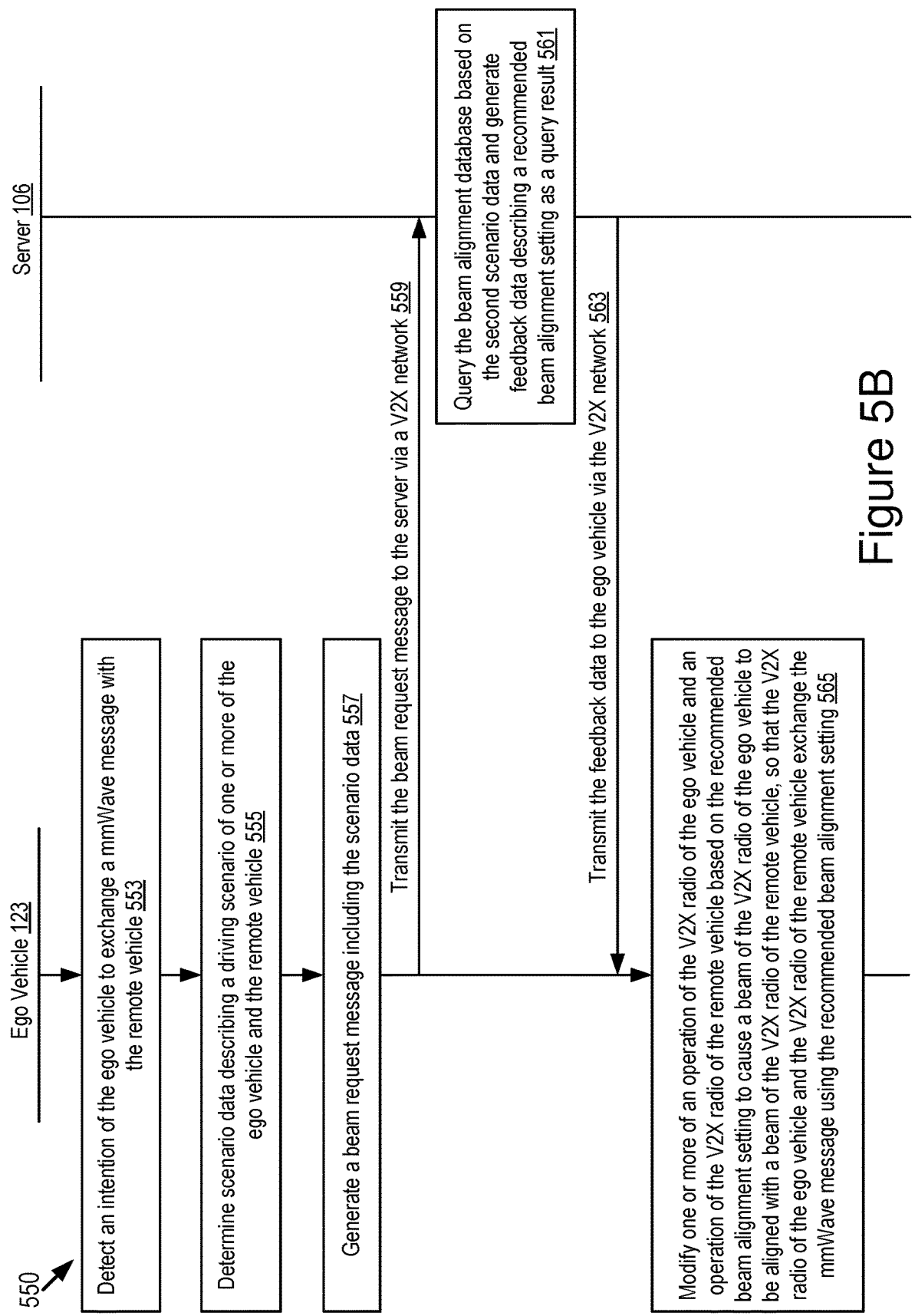
FIG. 5B depicts an example process for modifying a V2X radio based on beam alignment feedback data according to some embodiments.

FIG. 5B depicts an example process 550 for modifying the V2X radio 143 based on beam alignment feedback data according to some embodiments. The steps of the process 550 are executable in any order, and not necessarily the order depicted in FIG. 5B.

At step 553, the intention detection module 204 of the ego vehicle 123 detects an intention of the ego vehicle 123 to exchange a mmWave message with another endpoint. By way of examples, here assume that the other endpoint is the remote vehicle 124. Of course, the other endpoint can be any other type of endpoint such as a roadside unit, a base station, etc.

At step 555, the scenario module 206 of the ego vehicle 123 determines scenario data describing a driving scenario of one or more of the ego vehicle 123 and the remote vehicle 124.

At step 557, the report module 207 of the ego vehicle 123 generates a beam request message including the scenario data.

At step 559, the report module 207 of the ego vehicle 123 transmits the beam request message to the server 106 via the V2X network.

At step 561, the feedback system 109 of the server 106 queries the beam alignment database 110 based on the scenario data and generates feedback data describing a recommended beam alignment setting as a query result.

At step 563, the feedback system 109 of the server 106 sends the feedback data to the ego vehicle 123 via the V2X network.

At step 565, the operation module 210 of the ego vehicle 123 modifies one or more of (1) an operation of the V2X radio 143 of the ego vehicle 123 and (2) an operation of the V2X radio 143 of the remote vehicle 124 based on the recommended beam alignment setting to cause a beam of the V2X radio 143 of the ego vehicle 123 to be aligned with a beam of the V2X radio 143 of the remote vehicle 124, so that the V2X radio 143 of the ego vehicle 123 and the V2X radio 143 of the remote vehicle 124 exchange the mmWave message using the recommended beam alignment setting.

Referring now to FIG. 6, depicted is another block diagram illustrating an operating environment 600 for a modification system according to some embodiments. The operating environment 600 includes the following elements: the server 106; an ego vehicle 123; one or more remote vehicles 124; and the vehicular micro cloud 194. These elements of the operating environment 600 may be communicatively coupled to the network 105. The operating environment also includes the roadway environment 169. These elements of the operating environment 600 were described above with reference to FIGS. 1A-5B and the example general method, and so, those descriptions will not be repeated here: the server 106; an ego vehicle 123; one or more remote vehicles 124; the vehicular micro cloud 194; and the roadway environment 169.

Referring now to FIG. 7, depicted is a block diagram illustrating an example computer system 700 including a modification system according to some embodiments.

In some embodiments, the computer system 700 may include a special-purpose computer system that is programmed to perform one or more steps of methods 300, 400, 450 described above with reference to FIGS. 3-4B, the processes 500, 550 described above with reference to FIGS. 5A-5B, the example general method described above, and/or the method 800 described below with reference to FIG. 8.

In some embodiments, the computer system 200 may be an element of the ego vehicle. In some embodiments, the computer system 200 may be an onboard vehicle computer of the ego vehicle. In some embodiments, the computer system 200 may include an engine control unit, head unit or some other processor-based computing device of the ego vehicle. In some embodiments, the computer system 200 is a corresponding element of the remote vehicle or the server.

The computer system 200 may include one or more of the following elements according to some examples: the modification system 199; the processor 125; the communication unit 145; the sensor set 182; the GPS unit 170; the memory 127; and a storage 241. The components of the computer system 700 are communicatively coupled by a bus 720.

In the illustrated embodiment, the processor 125 is communicatively coupled to the bus 720 via a signal line 738. The communication unit 145 is communicatively coupled to the bus 720 via a signal line 746. The sensor set 182 is communicatively coupled to the bus 720 via a signal line 748. The GPS unit 170 is communicatively coupled to the bus 720 via a signal line 749. The storage 241 is communicatively coupled to the bus 720 via a signal line 742. The memory 127 is communicatively coupled to the bus 720 via a signal line 744. The communication module 202 is communicatively coupled to the bus 720 via the signal line 722.

The following elements of the computer system 200 are described above with reference to FIGS. 1A-1B and the example general method, and so, those descriptions will not be repeated here: the processor 125; the communication unit 145; the sensor set 182; the GPS unit 170; and the memory 127.

The modification system 199 includes a machine learning module 704. The machine learning module 704 is communicatively coupled to the bus 720 via a signal line 724. In some embodiments, the machine learning module 704 includes codes and routines that describe a reinforcement learning scheduling algorithm with machine learning which is executed by the processor 125 and causes the processor 125 to execute a machine learning process. The machine learning process uses the local dynamic map as an input to the machine learning process. The local dynamic map is described by the LDM data. The machine learning process outputs schedule data describing the schedule. The communication module 202 provides the schedule data to the V2X radio 143 via the bus 720 so that the modification system 199 modifies the operation of the V2X radio 143. The V2X radio 143 is modified or reprogrammed by the modification system 199 so that the mmWave message is transmitted by the V2X radio 143 in compliance with the schedule described by the schedule data which is outputted by the machine learning module 704.

In some embodiments, the machine learning module 704 includes a Deep Q-network algorithm.

In some embodiments, the machine learning module 704 includes codes and routines that are operable, when executed by the processor 125, to cause the processor 125 to execute the machine learning process which is operable to receive the LDM data as an input and output the schedule data.

Figure 8:
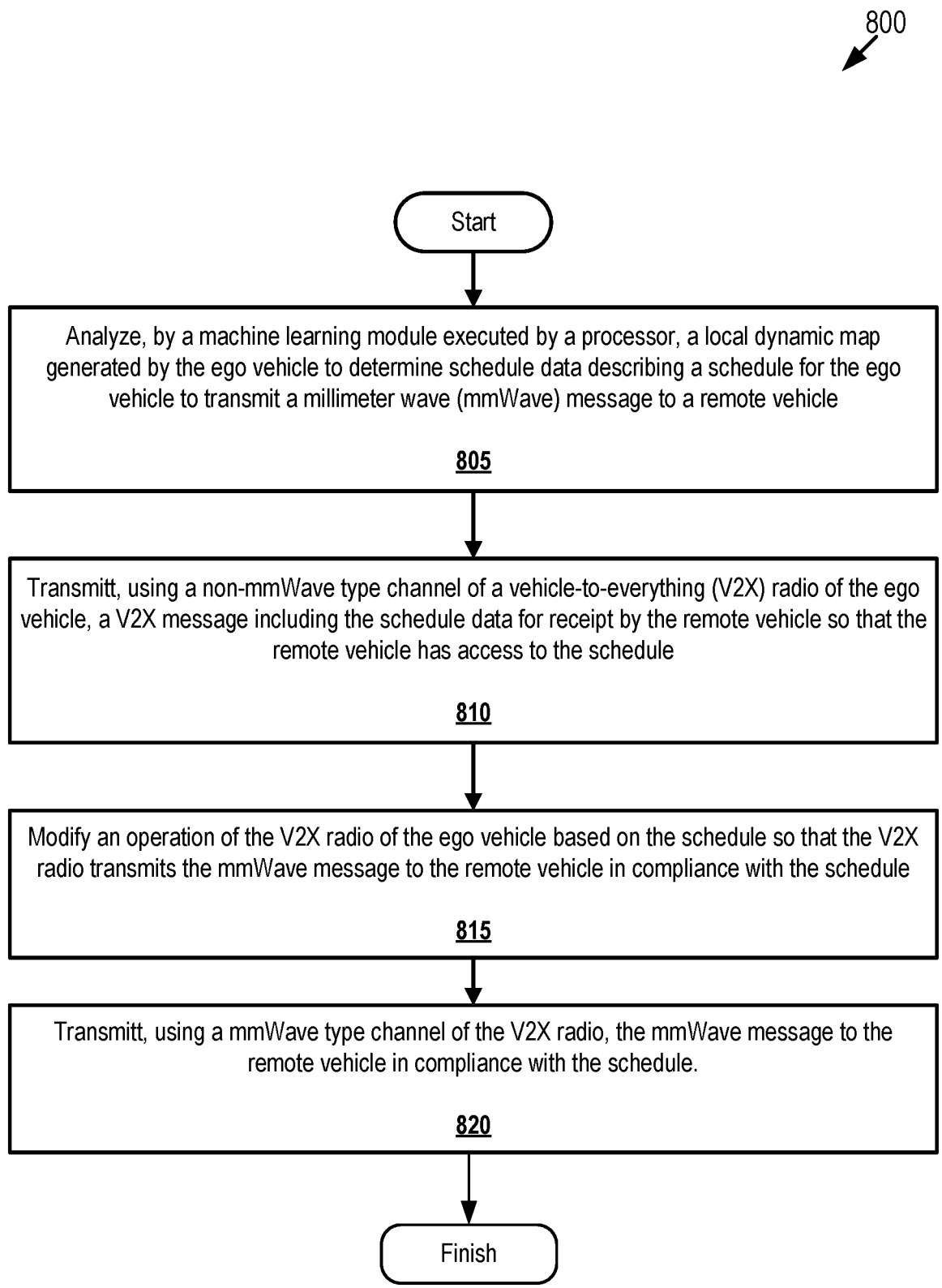
FIG. 8 depicts a method for modifying a millimeter radio of a first endpoint based on a schedule of point-to-point communications according to some embodiments.

Referring now to FIG. 8, depicted a method 800 for modifying a millimeter radio of a first endpoint based on a schedule of point-to-point communications according to some embodiments. The method 800 includes step 805, step 810, step 815, and step 820.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method for an ego vehicle, comprising:
   analyzing, by a machine learning module executed by a processor, a local dynamic map generated by the ego vehicle to determine schedule data describing a schedule for the ego vehicle to transmit a millimeter wave (mmWave) message to a remote vehicle;
   transmitting, using a non-mmWave type channel of a vehicle-to-everything (V2X) radio of the ego vehicle, a V2X message including the schedule data for receipt by the remote vehicle so that the remote vehicle has access to the schedule;
   modifying an operation of the V2X radio of the ego vehicle based on the schedule so that the V2X radio transmits the mmWave message to the remote vehicle in compliance with the schedule; and
   transmitting, using a mmWave type channel of the V2X radio, the mmWave message to the remote vehicle in compliance with the schedule.

2. The method of claim 1, wherein the machine learning module includes a reinforcement learning scheduling algorithm with machine learning which is executed by the processor and causes the processor to execute a machine learning process using the local dynamic map as an input to the machine learning process which outputs schedule data describing the schedule, wherein the schedule is provided to the V2X radio to modify the operation of the V2X radio so that the mmWave message is transmitted in compliance with the schedule.

3. The method of claim 1, wherein the mmWave message includes a payload that includes sensor data describing sensor measurements recorded by the ego vehicle.

4. The method of claim 1, wherein the local dynamic map includes a set of cells that represent a roadway environment and the local dynamic map is updated to include state information about whether the cells are occupied on a cell-by-cell basis.

5. The method of claim 1, wherein the local dynamic map includes a set of cells that represent a roadway environment and the local dynamic map is updated to include probability information about whether the cells are occupied on a cell-by-cell basis.

6. The method of claim 1, wherein the schedule includes information that describes one or more of the following: a prediction about a location of the remote vehicle at a particular time; a prediction about a quality of a communication link between the ego vehicle and the remote vehicle at the particular time; and a prediction about the usefulness of a payload of the mmWave message for both the ego vehicle and the remote vehicle.

7. The method of claim 1, further comprising a feedback loop that is operable to determine a success of the mmWave message and update the schedule based on the success so that a likelihood of a future success of a future mmWave message is increased.

8. The method of claim 1, wherein the schedule describes times and locations for transmitting the mmWave message on a point-to-point basis between the ego vehicle and the remote vehicle.

9. A system comprising:
an onboard vehicle computer system of an ego vehicle including a non-transitory memory storing computer code which, when executed by the onboard vehicle computer system, causes the onboard vehicle computer system to:
analyze, by a machine learning module executed by the onboard vehicle computer system, a local dynamic map generated by the ego vehicle to determine schedule data describing a schedule for the ego vehicle to transmit a millimeter wave (mmWave) message to a remote vehicle;
transmit, using a non-mmWave type channel of a vehicle-to-everything (V2X) radio of the ego vehicle which is communicatively coupled to the onboard vehicle computer system, a V2X message including the schedule data for receipt by the remote vehicle so that the remote vehicle has access to the schedule;
modify an operation of the V2X radio of the ego vehicle based on the schedule so that the V2X radio transmits the mmWave message to the remote vehicle in compliance with the schedule; and
transmit, using a mmWave type channel of the V2X radio, the mmWave message to the remote vehicle in compliance with the schedule.

10. The system of claim 9, wherein the machine learning module includes a reinforcement learning scheduling algorithm with machine learning which is executed by the onboard vehicle computer system and causes the onboard vehicle computer system to execute a machine learning process using the local dynamic map as an input to the machine learning process which outputs schedule data describing the schedule, wherein the schedule is provided to the V2X radio to modify the operation of the V2X radio so that the mmWave message is transmitted in compliance with the schedule.

11. The system of claim 9, wherein the mmWave message includes a payload that includes sensor data describing sensor measurements recorded by the ego vehicle.

12. The system of claim 9, wherein the local dynamic map includes a set of cells that represent a roadway environment and the local dynamic map is updated to include state information about whether the cells are occupied on a cell-by-cell basis.

13. The system of claim 9, wherein the local dynamic map includes a set of cells that represent a roadway environment and the local dynamic map is updated to include probability information about whether the cells are occupied on a cell-by-cell basis.

14. A computer program product comprising a non-transitory memory of an onboard vehicle computer system of an ego vehicle storing computer-executable code that, when executed by a processor, causes the processor to:
analyze, by a machine learning module executed by the onboard vehicle computer system, a local dynamic map generated by the ego vehicle to determine schedule data describing a schedule for the ego vehicle to transmit a millimeter wave (mmWave) message to a remote vehicle;
transmit, using a non-mmWave type channel of a vehicle-to-everything (V2X) radio of the ego vehicle, a V2X message including the schedule data for receipt by the remote vehicle so that the remote vehicle has access to the schedule;
modify an operation of the V2X radio of the ego vehicle based on the schedule so that the V2X radio transmits the mmWave message to the remote vehicle in compliance with the schedule; and
transmit, using a mmWave type channel of the V2X radio, the mmWave message to the remote vehicle in compliance with the schedule.

15. The computer program product of claim 14, wherein the machine learning module includes a reinforcement learning scheduling algorithm with machine learning which is executed by the processor and causes the processor to execute a machine learning process using the local dynamic map as an input to the machine learning process which outputs schedule data describing the schedule, wherein the schedule is provided to the V2X radio to modify the operation of the V2X radio so that the mmWave message is transmitted in compliance with the schedule.

16. The computer program product of claim 14, wherein the mmWave message includes a payload that includes sensor data describing sensor measurements recorded by the ego vehicle.

17. The computer program product of claim 14, wherein the local dynamic map includes a set of cells that represent a roadway environment and the local dynamic map is updated to include state information about whether the cells are occupied on a cell-by-cell basis.

18. The computer program product of claim 14, wherein the local dynamic map includes a set of cells that represent a roadway environment and the local dynamic map is updated to include probability information about whether the cells are occupied on a cell-by-cell basis.

19. The computer program product of claim 14, further comprising a feedback loop that is operable to determine a success of the mmWave message and update the schedule based on the success so that a likelihood of a future success of a future mmWave message is increased.

20. The computer program product of claim 14, wherein the schedule describes times and locations for transmitting the mmWave message on a point-to-point basis between the ego vehicle and the remote vehicle.

* * * * *